US009374607B2

(12) United States Patent
Bates et al.

(10) Patent No.: US 9,374,607 B2
(45) Date of Patent: Jun. 21, 2016

(54) MEDIA PLAYBACK SYSTEM WITH GUEST ACCESS

(75) Inventors: Paul Bates, Santa Barbara, CA (US); Lee Keyser-Allen, Medford, MA (US); Diane Roberts, Wakefield, MA (US); Jonathan P. Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 13/533,105

(22) Filed: Jun. 26, 2012

(65) Prior Publication Data
US 2013/0346859 A1 Dec. 26, 2013

(51) Int. Cl.
*G06F 3/0482* (2013.01)
*H04N 21/258* (2011.01)
*G06F 17/30* (2006.01)

(52) U.S. Cl.
CPC ........ *H04N 21/25816* (2013.01); *G06F 3/0482* (2013.01); *G06F 17/30053* (2013.01); *G06F 17/30772* (2013.01)

(58) Field of Classification Search
CPC ............................... G06F 3/048; G06F 3/0482
USPC ........................................................ 715/716
See application file for complete search history.

(56) References Cited

U.S. PATENT DOCUMENTS

| 4,296,278 A | 10/1981 | Cullison et al. |
| 4,696,037 A | 9/1987 | Fierens |
| 4,816,989 A | 3/1989 | Finn et al. |
| 5,153,579 A | 10/1992 | Fisch et al. |
| 5,182,552 A | 1/1993 | Paynting |
| 5,239,458 A | 8/1993 | Suzuki |
| 5,299,266 A | 3/1994 | Lumsden |
| 5,406,634 A | 4/1995 | Anderson et al. |

(Continued)

FOREIGN PATENT DOCUMENTS

| EP | 0251584 A2 | 1/1988 |
| EP | 0672985 A1 | 9/1995 |

(Continued)

OTHER PUBLICATIONS

Maniactools, "Identify Duplicate Files by Sound", Sep. 28, 2010, http://www.maniactools.com/soft/music-duplicate-remover/identify-duplicate-files-by-sound.shtml.*

(Continued)

*Primary Examiner* — Reza Nabi
*Assistant Examiner* — Daniel Rodriguez
(74) *Attorney, Agent, or Firm* — McDonnell Boehnen Hulbert & Berghoff LLP

(57) ABSTRACT

Systems and methods are provided to offer a restricted playback mode playlist mode to allow one or more participating users to access a host's media playback system and interact with a reduced subset of functions in that system. An example method includes providing, via a local media playback system, a restricted playback mode open to a plurality of participating users, the restricted playback mode providing a subset of playback functions from the local media playback system to the participating users, the subset including addition of content to a playlist for playback via the local media playback system. The example method includes facilitating addition of content to the playlist by at least one participating user. The example method includes facilitating playback of content from the playlist in the restricted playback mode.

39 Claims, 15 Drawing Sheets

(56) References Cited

U.S. PATENT DOCUMENTS

| | | | |
|---|---|---|---|
| 5,440,644 A | 8/1995 | Farinelli et al. |
| 5,467,342 A | 11/1995 | Logston et al. |
| 5,491,839 A | 2/1996 | Schotz |
| 5,533,021 A | 7/1996 | Branstad et al. |
| 5,553,147 A | 9/1996 | Pineau |
| 5,553,222 A | 9/1996 | Milne et al. |
| 5,602,992 A | 2/1997 | Danneels |
| 5,652,749 A | 7/1997 | Davenport et al. |
| 5,668,884 A | 9/1997 | Clair, Jr. et al. |
| 5,673,323 A | 9/1997 | Schotz et al. |
| 5,696,896 A | 12/1997 | Badovinatz et al. |
| 5,726,989 A | 3/1998 | Dokic |
| 5,751,819 A | 5/1998 | Dorrough |
| 5,761,320 A | 6/1998 | Farinelli et al. |
| 5,787,249 A | 7/1998 | Badovinatz et al. |
| 5,808,662 A * | 9/1998 | Kinney ............... G11B 27/002 348/14.1 |
| 5,815,689 A | 9/1998 | Shaw et al. |
| 5,867,691 A | 2/1999 | Shiraishi |
| 5,875,354 A | 2/1999 | Charlton et al. |
| 5,887,143 A | 3/1999 | Saito et al. |
| 5,923,869 A | 7/1999 | Kashiwagi et al. |
| 5,923,902 A | 7/1999 | Inagaki |
| 5,946,343 A | 8/1999 | Schotz et al. |
| 5,956,088 A | 9/1999 | Shen et al. |
| 6,009,457 A | 12/1999 | Moller |
| 6,026,150 A | 2/2000 | Frank et al. |
| 6,031,818 A | 2/2000 | Lo et al. |
| 6,078,725 A | 6/2000 | Tanaka |
| 6,108,485 A | 8/2000 | Kim |
| 6,108,686 A | 8/2000 | Williams, Jr. |
| 6,122,668 A | 9/2000 | Teng et al. |
| 6,128,318 A | 10/2000 | Sato |
| 6,157,957 A | 12/2000 | Berthaud |
| 6,163,647 A | 12/2000 | Terashima et al. |
| 6,175,872 B1 | 1/2001 | Neumann et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,253,293 B1 | 6/2001 | Rao et al. |
| 6,255,961 B1 | 7/2001 | Van Ryzin et al. |
| 6,256,554 B1 | 7/2001 | DiLorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,343,028 B1 | 1/2002 | Kuwaoka |
| 6,349,285 B1 | 2/2002 | Liu et al. |
| 6,349,339 B1 | 2/2002 | Williams |
| 6,351,821 B1 | 2/2002 | Voth |
| 6,404,811 B1 | 6/2002 | Cvetko et al. |
| 6,430,353 B1 | 8/2002 | Honda et al. |
| 6,449,653 B2 | 9/2002 | Klemets et al. |
| 6,456,783 B1 | 9/2002 | Ando et al. |
| 6,487,296 B1 | 11/2002 | Allen et al. |
| 6,522,886 B1 | 2/2003 | Youngs et al. |
| 6,526,325 B1 | 2/2003 | Sussman et al. |
| 6,535,121 B2 | 3/2003 | Matheny |
| 6,587,127 B1 | 7/2003 | Leeke et al. |
| 6,598,172 B1 | 7/2003 | VanDeusen et al. |
| 6,611,537 B1 | 8/2003 | Edens et al. |
| 6,631,410 B1 | 10/2003 | Kowalski et al. |
| 6,658,091 B1 * | 12/2003 | Naidoo ............ G08B 13/19669 379/37 |
| 6,674,803 B1 | 1/2004 | Kesselring |
| 6,687,664 B1 | 2/2004 | Sussman et al. |
| 6,757,517 B2 | 6/2004 | Chang |
| 6,763,274 B1 | 7/2004 | Gilbert |
| 6,778,493 B1 | 8/2004 | Ishii |
| 6,778,869 B2 | 8/2004 | Champion |
| 6,803,964 B1 | 10/2004 | Post et al. |
| 6,809,635 B1 | 10/2004 | Kaaresoja |
| 6,816,818 B2 | 11/2004 | Wolf et al. |
| 6,823,225 B1 | 11/2004 | Sass |
| 6,826,283 B1 | 11/2004 | Wheeler et al. |
| 6,836,788 B2 | 12/2004 | Kim et al. |
| 6,839,752 B1 | 1/2005 | Miller et al. |
| 6,882,335 B2 | 4/2005 | Saarinen |
| 6,898,642 B2 | 5/2005 | Chafle et al. |
| 6,907,458 B2 | 6/2005 | Tomassetti et al. |
| 6,912,610 B2 | 6/2005 | Spencer |
| 6,920,373 B2 | 7/2005 | Xi et al. |
| 6,934,766 B1 | 8/2005 | Russell |
| 6,970,482 B2 | 11/2005 | Kim |
| 6,985,694 B1 | 1/2006 | De Bonet et al. |
| 7,007,106 B1 | 2/2006 | Flood et al. |
| 7,020,791 B1 | 3/2006 | Aweya et al. |
| 7,043,651 B2 | 5/2006 | Aweya et al. |
| 7,047,308 B2 | 5/2006 | Deshpande |
| 7,058,889 B2 | 6/2006 | Trovato et al. |
| 7,068,596 B1 | 6/2006 | Mou |
| 7,113,999 B2 * | 9/2006 | Pestoni ................ H04L 29/06 707/999.01 |
| 7,115,017 B1 | 10/2006 | Laursen et al. |
| 7,130,368 B1 | 10/2006 | Aweya et al. |
| 7,130,608 B2 | 10/2006 | Hollstrom et al. |
| 7,130,616 B2 | 10/2006 | Janik |
| 7,136,934 B2 | 11/2006 | Carter et al. |
| 7,143,141 B1 | 11/2006 | Morgan et al. |
| 7,143,939 B2 | 12/2006 | Henzerling |
| 7,158,488 B2 | 1/2007 | Fujimori |
| 7,162,315 B2 | 1/2007 | Gilbert |
| 7,185,090 B2 | 2/2007 | Kowalski et al. |
| 7,187,947 B1 | 3/2007 | White et al. |
| 7,206,367 B1 | 4/2007 | Moore |
| 7,206,967 B1 | 4/2007 | Marti et al. |
| 7,209,795 B2 | 4/2007 | Sullivan et al. |
| 7,218,708 B2 | 5/2007 | Berezowski et al. |
| 7,236,739 B2 | 6/2007 | Chang |
| 7,236,773 B2 | 6/2007 | Thomas |
| 7,293,060 B2 | 11/2007 | Komsi |
| 7,312,785 B2 | 12/2007 | Tsuk et al. |
| 7,313,593 B1 | 12/2007 | Pulito et al. |
| 7,319,764 B1 | 1/2008 | Reid et al. |
| 7,324,857 B2 | 1/2008 | Goddard |
| 7,330,875 B1 | 2/2008 | Parasnis et al. |
| 7,333,519 B2 | 2/2008 | Sullivan et al. |
| 7,359,006 B1 | 4/2008 | Xiang et al. |
| 7,372,846 B2 | 5/2008 | Zwack |
| 7,392,102 B2 | 6/2008 | Sullivan et al. |
| 7,392,481 B2 | 6/2008 | Gewickey et al. |
| 7,412,499 B2 | 8/2008 | Chang et al. |
| 7,474,677 B2 | 1/2009 | Trott |
| 7,483,538 B2 | 1/2009 | McCarty et al. |
| 7,483,540 B2 | 1/2009 | Rabinowitz et al. |
| 7,483,958 B1 | 1/2009 | Elabbady et al. |
| 7,509,181 B2 | 3/2009 | Champion |
| 7,519,667 B1 | 4/2009 | Capps |
| 7,571,014 B1 | 8/2009 | Lambourne et al. |
| 7,574,274 B2 | 8/2009 | Holmes |
| 7,599,685 B2 | 10/2009 | Goldberg et al. |
| 7,606,174 B2 | 10/2009 | Ochi et al. |
| 7,631,119 B2 | 12/2009 | Moore et al. |
| 7,643,894 B2 | 1/2010 | Braithwaite et al. |
| 7,657,224 B2 | 2/2010 | Goldberg et al. |
| 7,657,644 B1 | 2/2010 | Zheng |
| 7,657,910 B1 | 2/2010 | McAulay et al. |
| 7,668,990 B2 | 2/2010 | Krzyzanowski et al. |
| 7,669,113 B1 | 2/2010 | Moore et al. |
| 7,669,219 B2 | 2/2010 | Scott, III |
| 7,672,470 B2 | 3/2010 | Lee |
| 7,675,943 B2 | 3/2010 | Mosig et al. |
| 7,676,142 B1 | 3/2010 | Hung |
| 7,689,304 B2 | 3/2010 | Sasaki |
| 7,689,305 B2 | 3/2010 | Kreifeldt et al. |
| 7,702,279 B2 | 4/2010 | Ko et al. |
| 7,702,403 B1 | 4/2010 | Gladwin et al. |
| 7,711,774 B1 | 5/2010 | Rothschild |
| 7,720,096 B2 | 5/2010 | Klemets |
| 7,742,740 B2 | 6/2010 | Goldberg et al. |
| 7,743,009 B2 * | 6/2010 | Hangartner et al. ............ 706/46 |
| 7,765,315 B2 | 7/2010 | Batson et al. |
| RE41,608 E | 8/2010 | Blair et al. |
| 7,827,259 B2 | 11/2010 | Heller et al. |
| 7,835,689 B2 | 11/2010 | Goldberg et al. |

(56) References Cited

U.S. PATENT DOCUMENTS

| | | | |
|---|---|---|---|
| 7,853,341 B2 | 12/2010 | McCarty et al. |
| 7,865,137 B2 | 1/2011 | Goldberg et al. |
| 7,885,622 B2 | 2/2011 | Krampf et al. |
| 7,916,877 B2 | 3/2011 | Goldberg et al. |
| 7,917,082 B2 | 3/2011 | Goldberg et al. |
| 7,934,239 B1 | 4/2011 | Dagman |
| 7,958,441 B2 | 6/2011 | Heller et al. |
| 7,996,566 B1* | 8/2011 | Sylvain ............... H04N 7/15 709/202 |
| 7,996,588 B2 | 8/2011 | Subbiah et al. |
| 8,014,423 B2 | 9/2011 | Thaler et al. |
| 8,015,306 B2 | 9/2011 | Bowman |
| 8,020,023 B2 | 9/2011 | Millington et al. |
| 8,023,663 B2 | 9/2011 | Goldberg |
| 8,028,038 B2 | 9/2011 | Weel |
| 8,028,323 B2 | 9/2011 | Weel |
| 8,045,721 B2 | 10/2011 | Burgan et al. |
| 8,045,952 B2 | 10/2011 | Qureshey et al. |
| 8,050,652 B2 | 11/2011 | Qureshey et al. |
| 8,055,364 B2 | 11/2011 | Champion |
| 8,074,253 B1 | 12/2011 | Nathan |
| 8,086,752 B2 | 12/2011 | Millington et al. |
| 8,090,317 B2 | 1/2012 | Burge et al. |
| 8,103,009 B2 | 1/2012 | McCarty et al. |
| 8,111,132 B2 | 2/2012 | Allen et al. |
| 8,112,032 B2 | 2/2012 | Ko et al. |
| 8,116,476 B2 | 2/2012 | Inohara |
| 8,126,172 B2 | 2/2012 | Horbach et al. |
| 8,131,390 B2 | 3/2012 | Braithwaite et al. |
| 8,144,883 B2 | 3/2012 | Pedersen et al. |
| 8,148,622 B2 | 4/2012 | Rothkopf et al. |
| 8,169,938 B2 | 5/2012 | Duchscher et al. |
| 8,170,260 B2 | 5/2012 | Reining et al. |
| 8,175,297 B1 | 5/2012 | Ho et al. |
| 8,185,674 B2 | 5/2012 | Moore et al. |
| 8,194,874 B2 | 6/2012 | Starobin et al. |
| 8,204,890 B1* | 6/2012 | Gogan ............. G06F 17/30053 707/748 |
| 8,208,653 B2 | 6/2012 | Eo et al. |
| 8,214,447 B2 | 7/2012 | Deslippe et al. |
| 8,214,740 B2 | 7/2012 | Johnson |
| 8,214,873 B2 | 7/2012 | Weel |
| 8,218,790 B2 | 7/2012 | Bull et al. |
| 8,230,099 B2 | 7/2012 | Weel |
| 8,233,648 B2 | 7/2012 | Sorek et al. |
| 8,234,395 B2 | 7/2012 | Millington |
| 8,239,748 B1 | 8/2012 | Moore et al. |
| 8,279,709 B2 | 10/2012 | Choisel et al. |
| 8,281,001 B2 | 10/2012 | Busam et al. |
| 8,285,404 B1* | 10/2012 | Kekki ............... G06F 17/30772 700/94 |
| 8,290,603 B1 | 10/2012 | Lambourne |
| 8,300,845 B2 | 10/2012 | Zurek et al. |
| 8,315,555 B2 | 11/2012 | Ko et al. |
| 8,316,147 B2 | 11/2012 | Batson et al. |
| 8,325,931 B2 | 12/2012 | Howard et al. |
| 8,340,330 B2 | 12/2012 | Yoon et al. |
| 8,345,709 B2 | 1/2013 | Nitzpon et al. |
| 8,364,295 B2 | 1/2013 | Beckmann et al. |
| 8,370,678 B2 | 2/2013 | Millington et al. |
| 8,407,623 B2 | 3/2013 | Kerr et al. |
| 8,423,659 B2 | 4/2013 | Millington |
| 8,423,893 B2 | 4/2013 | Ramsay et al. |
| 8,432,851 B2 | 4/2013 | Xu et al. |
| 8,433,076 B2 | 4/2013 | Zurek et al. |
| 8,457,334 B2 | 6/2013 | Yoon et al. |
| 8,463,184 B2 | 6/2013 | Dua |
| 8,463,875 B2 | 6/2013 | Katz et al. |
| 8,473,844 B2 | 6/2013 | Kreifeldt et al. |
| 8,509,211 B2 | 8/2013 | Trotter et al. |
| 8,520,870 B2 | 8/2013 | Sato et al. |
| 8,577,048 B2 | 11/2013 | Chaikin et al. |
| 8,588,949 B2 | 11/2013 | Lambourne et al. |
| 8,611,559 B2 | 12/2013 | Sanders |
| 8,615,091 B2 | 12/2013 | Terwal |
| 8,639,830 B2 | 1/2014 | Bowman |
| 8,672,744 B1* | 3/2014 | Gronkowski ......... G07F 17/323 463/25 |
| 8,683,009 B2 | 3/2014 | Ng et al. |
| 8,731,206 B1 | 5/2014 | Park |
| 8,750,282 B2 | 6/2014 | Gelter et al. |
| 8,751,026 B2 | 6/2014 | Sato et al. |
| 8,762,565 B2 | 6/2014 | Togashi et al. |
| 8,775,546 B2 | 7/2014 | Millington |
| 8,818,538 B2 | 8/2014 | Sakata |
| 8,819,554 B2 | 8/2014 | Basso et al. |
| 8,843,586 B2 | 9/2014 | Pantos et al. |
| 8,885,851 B2 | 11/2014 | Westenbroek |
| 8,904,066 B2 | 12/2014 | Moore et al. |
| 8,917,877 B2 | 12/2014 | Haaff et al. |
| 8,930,006 B2 | 1/2015 | Haatainen |
| 8,934,647 B2 | 1/2015 | Joyce et al. |
| 8,934,655 B2 | 1/2015 | Breen et al. |
| 8,954,177 B2 | 2/2015 | Sanders |
| 8,965,544 B2 | 2/2015 | Ramsay |
| 8,966,394 B2 | 2/2015 | Gates et al. |
| 9,137,602 B2 | 9/2015 | Mayman et al. |
| 9,160,965 B2* | 10/2015 | Redmann ............... H04N 7/144 |
| 2001/0009604 A1 | 7/2001 | Ando et al. |
| 2001/0022823 A1 | 9/2001 | Renaud |
| 2001/0027498 A1 | 10/2001 | Van De Meulenhof et al. |
| 2001/0032188 A1 | 10/2001 | Miyabe et al. |
| 2001/0042107 A1 | 11/2001 | Palm |
| 2001/0046235 A1 | 11/2001 | Trevitt et al. |
| 2001/0047377 A1 | 11/2001 | Sincaglia et al. |
| 2002/0002039 A1 | 1/2002 | Qureshey et al. |
| 2002/0002562 A1 | 1/2002 | Moran et al. |
| 2002/0002565 A1 | 1/2002 | Ohyama |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0062406 A1 | 5/2002 | Chang et al. |
| 2002/0065926 A1 | 5/2002 | Hackney et al. |
| 2002/0067909 A1* | 6/2002 | Iivonen .................. H04N 7/165 386/275 |
| 2002/0072816 A1 | 6/2002 | Shdema et al. |
| 2002/0073228 A1 | 6/2002 | Cognet et al. |
| 2002/0080783 A1 | 6/2002 | Fujimori |
| 2002/0090914 A1 | 7/2002 | Kang et al. |
| 2002/0093478 A1 | 7/2002 | Yeh |
| 2002/0095460 A1 | 7/2002 | Benson |
| 2002/0103635 A1 | 8/2002 | Mesarovic et al. |
| 2002/0109710 A1 | 8/2002 | Holtz et al. |
| 2002/0112244 A1* | 8/2002 | Liou .................. H04L 12/1827 725/93 |
| 2002/0114354 A1 | 8/2002 | Sinha et al. |
| 2002/0114359 A1 | 8/2002 | Ibaraki et al. |
| 2002/0124097 A1 | 9/2002 | Isely et al. |
| 2002/0129156 A1 | 9/2002 | Yoshikawa |
| 2002/0136335 A1 | 9/2002 | Liou et al. |
| 2002/0143998 A1 | 10/2002 | Rajagopal et al. |
| 2002/0159596 A1 | 10/2002 | Durand et al. |
| 2002/0163361 A1 | 11/2002 | Parkin |
| 2002/0165721 A1 | 11/2002 | Chang et al. |
| 2002/0165921 A1 | 11/2002 | Sapieyevski |
| 2002/0168938 A1 | 11/2002 | Chang |
| 2002/0173273 A1 | 11/2002 | Spurgat et al. |
| 2002/0177411 A1 | 11/2002 | Yajima et al. |
| 2002/0184310 A1 | 12/2002 | Traversat et al. |
| 2002/0188762 A1 | 12/2002 | Tomassetti et al. |
| 2002/0194309 A1 | 12/2002 | Carter et al. |
| 2003/0002609 A1 | 1/2003 | Faller et al. |
| 2003/0018797 A1 | 1/2003 | Dunning et al. |
| 2003/0020763 A1 | 1/2003 | Mayer et al. |
| 2003/0023741 A1 | 1/2003 | Tomassetti et al. |
| 2003/0035072 A1 | 2/2003 | Hagg |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0055892 A1 | 3/2003 | Huitema et al. |

(56) References Cited

U.S. PATENT DOCUMENTS

| | | |
|---|---|---|
| 2003/0061428 A1 | 3/2003 | Garney et al. |
| 2003/0066094 A1 | 4/2003 | Van Der Schaar et al. |
| 2003/0067437 A1 | 4/2003 | McClintock et al. |
| 2003/0073432 A1 | 4/2003 | Meade, II |
| 2003/0097478 A1 | 5/2003 | King |
| 2003/0099212 A1 | 5/2003 | Anjum et al. |
| 2003/0099221 A1 | 5/2003 | Rhee |
| 2003/0101253 A1 | 5/2003 | Saito et al. |
| 2003/0110329 A1 | 6/2003 | Higaki et al. |
| 2003/0126211 A1* | 7/2003 | Anttila .............. H04L 29/06 709/205 |
| 2003/0135822 A1 | 7/2003 | Evans |
| 2003/0157951 A1 | 8/2003 | Hasty, Jr. |
| 2003/0195964 A1 | 10/2003 | Mane |
| 2003/0198254 A1 | 10/2003 | Sullivan et al. |
| 2003/0198255 A1 | 10/2003 | Sullivan et al. |
| 2003/0198257 A1 | 10/2003 | Sullivan et al. |
| 2003/0200001 A1 | 10/2003 | Goddard |
| 2003/0204273 A1 | 10/2003 | Dinker et al. |
| 2003/0204509 A1 | 10/2003 | Dinker et al. |
| 2003/0210796 A1 | 11/2003 | McCarty et al. |
| 2003/0219007 A1 | 11/2003 | Barrack et al. |
| 2003/0227478 A1* | 12/2003 | Chatfield ............... 345/751 |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0012620 A1 | 1/2004 | Buhler et al. |
| 2004/0015252 A1 | 1/2004 | Aiso et al. |
| 2004/0019497 A1 | 1/2004 | Volk et al. |
| 2004/0019911 A1 | 1/2004 | Gates et al. |
| 2004/0023697 A1 | 2/2004 | Komura |
| 2004/0024478 A1 | 2/2004 | Hans et al. |
| 2004/0024925 A1 | 2/2004 | Cypher et al. |
| 2004/0027166 A1 | 2/2004 | Mangum et al. |
| 2004/0032348 A1 | 2/2004 | Lai et al. |
| 2004/0041836 A1* | 3/2004 | Zaner ................. G06Q 10/10 715/751 |
| 2004/0048569 A1 | 3/2004 | Kawamura |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0080671 A1 | 4/2004 | Siemens et al. |
| 2004/0093096 A1 | 5/2004 | Huang et al. |
| 2004/0098754 A1 | 5/2004 | Vella et al. |
| 2004/0111473 A1 | 6/2004 | Lysenko et al. |
| 2004/0128701 A1 | 7/2004 | Kaneko et al. |
| 2004/0131192 A1 | 7/2004 | Metcalf |
| 2004/0133689 A1 | 7/2004 | Vasisht |
| 2004/0143368 A1 | 7/2004 | May et al. |
| 2004/0143852 A1 | 7/2004 | Meyers |
| 2004/0148237 A1 | 7/2004 | Bittmann et al. |
| 2004/0170383 A1 | 9/2004 | Mazur |
| 2004/0179554 A1 | 9/2004 | Tsao |
| 2004/0203378 A1 | 10/2004 | Powers |
| 2004/0208158 A1 | 10/2004 | Fellman et al. |
| 2004/0213230 A1 | 10/2004 | Douskalis et al. |
| 2004/0224638 A1 | 11/2004 | Fadell et al. |
| 2004/0228367 A1 | 11/2004 | Mosig |
| 2004/0248601 A1 | 12/2004 | Chang |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2005/0010691 A1 | 1/2005 | Oyadomari et al. |
| 2005/0011388 A1 | 1/2005 | Kouznetsov |
| 2005/0013394 A1 | 1/2005 | Rausch et al. |
| 2005/0015551 A1 | 1/2005 | Eames et al. |
| 2005/0021590 A1 | 1/2005 | Debique et al. |
| 2005/0027821 A1 | 2/2005 | Alexander et al. |
| 2005/0047605 A1 | 3/2005 | Lee et al. |
| 2005/0058149 A1 | 3/2005 | Howe |
| 2005/0062637 A1 | 3/2005 | El Zabadani et al. |
| 2005/0081213 A1 | 4/2005 | Suzuoki et al. |
| 2005/0114538 A1 | 5/2005 | Rose |
| 2005/0120128 A1 | 6/2005 | Willes et al. |
| 2005/0125222 A1 | 6/2005 | Brown et al. |
| 2005/0125357 A1 | 6/2005 | Saadat et al. |
| 2005/0131558 A1 | 6/2005 | Braithwaite et al. |
| 2005/0166135 A1 | 7/2005 | Burke et al. |
| 2005/0168630 A1 | 8/2005 | Yamada et al. |
| 2005/0177643 A1 | 8/2005 | Xu |
| 2005/0181348 A1 | 8/2005 | Carey et al. |
| 2005/0195205 A1 | 9/2005 | Abrams |
| 2005/0195823 A1 | 9/2005 | Chen et al. |
| 2005/0198574 A1 | 9/2005 | Lamkin et al. |
| 2005/0201549 A1 | 9/2005 | Dedieu et al. |
| 2005/0216556 A1 | 9/2005 | Manion et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0041639 A1 | 2/2006 | Lamkin et al. |
| 2006/0095516 A1 | 5/2006 | Wijeratne |
| 2006/0098936 A1 | 5/2006 | Ikeda et al. |
| 2006/0119497 A1 | 6/2006 | Miller et al. |
| 2006/0143236 A1 | 6/2006 | Wu |
| 2006/0155721 A1 | 7/2006 | Grunwald et al. |
| 2006/0193454 A1 | 8/2006 | Abou-Chakra et al. |
| 2007/0003067 A1 | 1/2007 | Gierl et al. |
| 2007/0022207 A1 | 1/2007 | Millington et al. |
| 2007/0038999 A1 | 2/2007 | Millington et al. |
| 2007/0043847 A1 | 2/2007 | Carter et al. |
| 2007/0047712 A1 | 3/2007 | Gross et al. |
| 2007/0048713 A1 | 3/2007 | Plastina et al. |
| 2007/0054680 A1 | 3/2007 | Mo et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0169115 A1 | 7/2007 | Ko et al. |
| 2007/0180137 A1 | 8/2007 | Rajapakse |
| 2007/0192156 A1 | 8/2007 | Gauger |
| 2007/0249295 A1 | 10/2007 | Ukita et al. |
| 2007/0265031 A1 | 11/2007 | Koizumi et al. |
| 2007/0271388 A1 | 11/2007 | Bowra et al. |
| 2007/0299778 A1 | 12/2007 | Haveson et al. |
| 2008/0002836 A1* | 1/2008 | Moeller ............... G10K 11/175 381/73.1 |
| 2008/0022320 A1 | 1/2008 | Ver |
| 2008/0025535 A1* | 1/2008 | Rajapakse ............. H04L 65/605 381/311 |
| 2008/0077619 A1* | 3/2008 | Gilley ................. G06Q 30/02 |
| 2008/0077620 A1* | 3/2008 | Gilley ................. G06F 19/3406 |
| 2008/0086318 A1* | 4/2008 | Gilley ................. G06Q 10/06 705/319 |
| 2008/0091771 A1 | 4/2008 | Allen et al. |
| 2008/0120429 A1 | 5/2008 | Millington et al. |
| 2008/0126943 A1 | 5/2008 | Parasnis et al. |
| 2008/0144861 A1 | 6/2008 | Melanson et al. |
| 2008/0144864 A1 | 6/2008 | Huon |
| 2008/0146289 A1 | 6/2008 | Korneluk et al. |
| 2008/0189272 A1* | 8/2008 | Powers ............. G06F 17/30817 |
| 2008/0212786 A1 | 9/2008 | Park |
| 2008/0215169 A1 | 9/2008 | DeBettencourt et al. |
| 2008/0263010 A1* | 10/2008 | Roychoudhuri .. G06F 17/30056 |
| 2009/0017868 A1 | 1/2009 | Ueda et al. |
| 2009/0031336 A1 | 1/2009 | Chavez et al. |
| 2009/0089327 A1* | 4/2009 | Kalaboukis ....... G06F 17/30053 |
| 2009/0100189 A1 | 4/2009 | Bahren et al. |
| 2009/0157905 A1 | 6/2009 | Davis |
| 2009/0193345 A1 | 7/2009 | Wensley et al. |
| 2009/0222115 A1* | 9/2009 | Malcolm ........... G06F 17/30749 700/94 |
| 2009/0228919 A1 | 9/2009 | Zott et al. |
| 2009/0251604 A1 | 10/2009 | Iyer |
| 2010/0004983 A1 | 1/2010 | Dickerson et al. |
| 2010/0031366 A1 | 2/2010 | Knight et al. |
| 2010/0049835 A1 | 2/2010 | Ko et al. |
| 2010/0228740 A1* | 9/2010 | Cannistraro et al. ......... 707/748 |
| 2010/0284389 A1* | 11/2010 | Ramsay et al. ............. 370/338 |
| 2010/0299639 A1* | 11/2010 | Ramsay et al. ............. 715/835 |
| 2011/0002487 A1 | 1/2011 | Panther et al. |
| 2011/0066943 A1* | 3/2011 | Brillon ............... G06Q 30/0603 |

(56) References Cited

U.S. PATENT DOCUMENTS

| | | | |
|---|---|---|---|
| 2011/0228944 A1 | 9/2011 | Croghan et al. | 715/716 |
| 2012/0029671 A1 | 2/2012 | Millington et al. | |
| 2012/0030366 A1 | 2/2012 | Collart et al. | |
| 2012/0051567 A1 | 3/2012 | Castor-Perry | |
| 2012/0060046 A1 | 3/2012 | Millington | |
| 2012/0129446 A1 | 5/2012 | Ko et al. | |
| 2012/0148075 A1 | 6/2012 | Goh et al. | |
| 2012/0185771 A1* | 7/2012 | Rothkopf | G11B 27/105 715/716 |
| 2012/0207290 A1* | 8/2012 | Moyers | G06Q 10/10 379/90.01 |
| 2012/0237054 A1 | 9/2012 | Eo et al. | |
| 2012/0281058 A1* | 11/2012 | Laney | H04N 7/147 348/14.03 |
| 2012/0290621 A1* | 11/2012 | Heitz et al. | 707/780 |
| 2013/0018960 A1* | 1/2013 | Knysz | H04L 65/403 709/204 |
| 2013/0022221 A1 | 1/2013 | Kallai et al. | |
| 2013/0031475 A1* | 1/2013 | Maor | A63F 13/12 715/706 |
| 2013/0038726 A1 | 2/2013 | Kim | |
| 2013/0041954 A1* | 2/2013 | Kim | H04L 65/1069 709/204 |
| 2013/0047084 A1 | 2/2013 | Sanders et al. | |
| 2013/0052940 A1* | 2/2013 | Brillhart | H04L 12/189 455/3.06 |
| 2013/0070093 A1* | 3/2013 | Rivera | G11B 27/002 348/143 |
| 2013/0080599 A1 | 3/2013 | Ko et al. | |
| 2013/0124664 A1* | 5/2013 | Fonseca, Jr. | H04L 67/125 709/208 |
| 2013/0125153 A1* | 5/2013 | Hilson | H04H 60/00 725/5 |
| 2013/0129122 A1 | 5/2013 | Johnson et al. | |
| 2013/0132837 A1* | 5/2013 | Mead | G06Q 10/10 715/716 |
| 2013/0159126 A1* | 6/2013 | Elkady | H04L 67/10 705/26.1 |
| 2013/0167029 A1 | 6/2013 | Friesen et al. | |
| 2013/0174100 A1* | 7/2013 | Seymour | G06F 3/0487 715/863 |
| 2013/0179163 A1* | 7/2013 | Herbig | H04R 3/005 704/233 |
| 2013/0191454 A1* | 7/2013 | Oliver | G06Q 10/10 709/204 |
| 2013/0197682 A1 | 8/2013 | Millington | |
| 2013/0230175 A1 | 9/2013 | Bech et al. | |
| 2013/0253934 A1* | 9/2013 | Parekh | G06Q 10/107 704/258 |
| 2013/0279706 A1 | 10/2013 | Marti | |
| 2013/0287186 A1* | 10/2013 | Quady | H04M 11/00 379/90.01 |
| 2013/0290504 A1* | 10/2013 | Quady | H04L 41/50 709/223 |
| 2014/0006483 A1 | 1/2014 | Garmark et al. | |
| 2014/0037097 A1 | 2/2014 | Labosco | |
| 2014/0064501 A1 | 3/2014 | Olsen et al. | |
| 2014/0075308 A1 | 3/2014 | Sanders et al. | |
| 2014/0075311 A1 | 3/2014 | Boettcher et al. | |
| 2014/0079242 A1 | 3/2014 | Nguyen et al. | |
| 2014/0108929 A1 | 4/2014 | Garmark et al. | |
| 2014/0123005 A1 | 5/2014 | Forstall et al. | |
| 2014/0140530 A1 | 5/2014 | Gomes-Casseres et al. | |
| 2014/0161265 A1 | 6/2014 | Chaikin et al. | |
| 2014/0181569 A1 | 6/2014 | Millington et al. | |
| 2014/0242913 A1 | 8/2014 | Pang | |
| 2014/0256260 A1 | 9/2014 | Ueda et al. | |
| 2014/0267148 A1 | 9/2014 | Luna et al. | |
| 2014/0270202 A1 | 9/2014 | Ivanov et al. | |
| 2014/0273859 A1 | 9/2014 | Luna et al. | |
| 2014/0279889 A1 | 9/2014 | Luna | |
| 2014/0285313 A1 | 9/2014 | Luna et al. | |
| 2014/0286496 A1 | 9/2014 | Luna et al. | |
| 2014/0298174 A1* | 10/2014 | Ikonomov | G06F 3/0481 715/719 |
| 2014/0323036 A1 | 10/2014 | Daley et al. | |
| 2014/0344689 A1 | 11/2014 | Scott et al. | |
| 2014/0378056 A1 | 12/2014 | Liu | |
| 2015/0019670 A1* | 1/2015 | Redmann | H04L 65/4092 709/207 |
| 2015/0026613 A1 | 1/2015 | Kwon et al. | |
| 2015/0032844 A1 | 1/2015 | Tarr et al. | |
| 2015/0043736 A1 | 2/2015 | Olsen et al. | |
| 2015/0049248 A1 | 2/2015 | Wang et al. | |
| 2015/0074527 A1 | 3/2015 | Sevigny et al. | |
| 2015/0074528 A1 | 3/2015 | Sakalowsky et al. | |
| 2015/0098576 A1 | 4/2015 | Sundaresan et al. | |
| 2015/0139210 A1 | 5/2015 | Marin et al. | |
| 2015/0256954 A1 | 9/2015 | Carlsson et al. | |
| 2015/0304288 A1* | 10/2015 | Balasaygun | H04L 63/166 713/151 |

FOREIGN PATENT DOCUMENTS

| | | |
|---|---|---|
| EP | 0772374 A2 | 5/1997 |
| EP | 1111527 A2 | 6/2001 |
| EP | 1122931 A2 | 8/2001 |
| EP | 0895427 A3 | 1/2006 |
| EP | 2043381 A2 | 4/2009 |
| EP | 2161950 A2 | 3/2010 |
| EP | 2713281 | 4/2014 |
| EP | 2591617 B1 | 6/2014 |
| GB | 2284327 A | 5/1995 |
| GB | 2338374 | 12/1999 |
| GB | 2486183 | 6/2012 |
| JP | 07-210129 | 8/1995 |
| JP | 2002111817 | 4/2002 |
| JP | 2002123267 A | 4/2002 |
| JP | 2003037585 | 2/2003 |
| JP | 2003506765 A | 2/2003 |
| JP | 2003101958 | 4/2003 |
| JP | 2003169089 A | 6/2003 |
| JP | 2005108427 | 4/2005 |
| JP | 2005136457 | 5/2005 |
| JP | 2007241652 A | 9/2007 |
| JP | 2009506603 A | 2/2009 |
| JP | 2009135750 | 6/2009 |
| JP | 2009538006 A | 10/2009 |
| JP | 2011130496 | 6/2011 |
| WO | 9525313 A1 | 9/1995 |
| WO | 9961985 A1 | 12/1999 |
| WO | 0110125 A1 | 2/2001 |
| WO | 0153994 | 7/2001 |
| WO | 02073851 | 9/2002 |
| WO | 03093950 A2 | 11/2003 |
| WO | 2005013047 A2 | 2/2005 |
| WO | 2007023120 A1 | 3/2007 |
| WO | 2008114389 A1 | 9/2008 |
| WO | 2012050927 | 4/2012 |
| WO | 2014149533 A2 | 9/2014 |

OTHER PUBLICATIONS

Maniactools, "Indentify Duplicate Files by Sound", available at <http://www.maniactools.com/soft/music-duplicate-remover/identify-duplicate-files-by-sound.shtml>, archived on Sep. 28, 2010 at wayback machine <http:web.archived.org>, 2 pages.*

International Search Report, issued by the International Searching Authority in connection with PCT Application No. PCT/US2013/046386, on Sep. 30, 2013, 3 pages.

Written Opinion of the International Searching Authority, issued by the International Searching Authority in connection with PCT Application No. PCT/US2013/046386, on Sep. 30, 2013, 6 pages.

Voyetra Turtle Beach, Inc., AudioTron Quick Start Guide, Version 1.0, Mar. 2001 (24 pages).

Voyetra Turtle Beach, Inc., Audiotron Reference Manual, Version 3.0, May 2002 (70 pages).

Voyetra Turtle Beach, Inc., AudioTron Setup Guide, Version 3.0, May 2002 (32 pages).

Akyildiz I.F., et al., "Multimedia Group Synchronization Protocols for Integrated Services Networks," IEEE Journal on Selected Areas in Communications, 1996, vol. 14 (1), pp. 162-173.

(56) References Cited

OTHER PUBLICATIONS

Benslimane A., "A Multimedia Synchronization Protocol for Multicast Groups," Proceedings of the 26th Euromicro Conference, 2000, vol. 1, pp. 456-463.

Biersack E., et al., "Intra- and Inter-Stream Synchronisation for Stored Multimedia Streams," IEEE International Conference on Multimedia Computing and Systems, 1996, pp. 372-381.

Bretl W.E., et al., MPEG2 Tutorial [online], 2000 [retrieved on Jan. 13, 2009] Retrieved from the Internet< http://www.bretl.com/mpeghtml/MPEGindex.htm>, pp. 1-23.

United States Patent and Trademark Office, "Final Office Action", issued in connection with U.S. Appl. No. 10/816,217, mailed Jul. 13, 2009, 16 pages.

United States Patent and Trademark Office, "Final Office Action", issued in connection with U.S. Appl. No. 13/297,000, mailed on Sep. 13, 2012, 17 pages.

United States Patent and Trademark Office, "Final Office Action", issued in connection with U.S Appl. No. 10/816,217, mailed on Oct. 21, 2011, pp. 19.

United States Patent and Trademark Office, "Final Office Action", issued in connection with U.S. Appl. No. 10/816,217, mailed on Jan. 28, 2011, 21 pages.

United States Patent and Trademark Office, "Final Office Action", issued in connection with U.S. Appl. No. 10/816,217, mailed on Jun. 30, 2008, 30 pages.

Huang C.M., et al., "A Synchronization Infrastructure for Multicast Multimedia at the Presentation Layer," IEEE Transactions on Consumer Electronics, Aug. 1997, vol. 43, No. 3, pp. 370-380.

International Bureau,"Search Report" issued in connection with International Patent application No. PCT/US2013/046372, mailed on Aug. 26, 2013, 3 pages.

International Bureau,"Written opinion" issued in connection with International Patent application No. PCT/US2013/046372, mailed on Aug. 26, 2013, 4 pages.

International Bureau, "Search Report" issued in connection with International Application No. PCT/US04/23102, mailed on Aug. 1, 2008, 5 pages.

Ishibashi Y., "A Group Synchronization Mechanism for Live Media in Multicast Communications," IEEE Global Telecommunications Conference, 1997, vol. 2, pp. 746-752.

Ishibashi Y., "A Group Synchronization Mechanism for Stored Media in Multicast Communications," IEEE Information Revolution and Communications, 1997, vol. 2, pp. 692-700.

Jo J., et al., "Synchronized One-to-many Media Streaming with Adaptive Playout Control," Proceedings of SPIE, 2002, vol. 4861, pp. 71-82.

M. Nilsson., "ID3 Tag Version 2", Mar. 26, 1998, 28 Pages.

Mills D.L., "Network Time Protocol (Version 3) Specification, Implementation and Analysis," Network Working Group, Mar. 1992, <http://www.ietj.org/rfc/rfc1305.txt>, 7 pages.

Mills D.L., "Precision Synchronization of Computer Network Clocks," ACM SIGCOMM Computer Communication Review, 1994, vol. 24 (2), 16 pages.

Motorola., "Simplefi, Wireless Digital Audio Receiver, Installation and User Guide", Dec. 31, 2001, 111 pages.

United States Patent and Trademark Office, "Non-final Office Action", issued in connection with U.S. Appl. No. 13/619,237, mailed on Apr. 10, 2013, 10 pages.

United States Patent and Trademark Office, "Non-Final Office Action", issued in connection with U.S. Appl. No. 10/816,217, mailed on Jan. 18, 2008, 38 pages.

United States Patent and Trademark Office, "Non-Final Office Action", issued in connection with U.S. Appl. No. 10/816,217, mailed on Jun. 21, 2011, 13 pages.

United States Patent and Trademark Office, "Non-Final Office Action", issued in connection with U.S. Appl. No. 10/816,217, mailed on Jan. 22, 2009, 18 pages.

United States Patent and Trademark Office, "Non-Final Office Action", issued in connection with U.S. Appl. No. 10/816,217, mailed on Jun. 25, 2010, 17pages.

United States Patent and Trademark Office, "Non-Final Office Action", issued in connection with U.S. Appl. No. 13/297,000, mailed on Feb. 29, 2012, 10 pages.

United States Patent and Trademark Office,"Notice of Allowability", issued in connection with U.S. Appl. No. 13/619,237, Sep. 6, 2013, 4 pages.

United States Patent and Trademark Office, "Notice of Allowance", issued in connection with U.S. Appl. No. 10/816,217, mailed on Dec. 27, 2011, 15 pages.

Park S., et al., "Group Synchronization in MultiCast Media Communications," Proceedings of the 5th Research on Multicast Technology Workshop, 2003, 5 pages.

"Polycom Conference Composer manual: copyright 2001", 29 pages.

PRISMIQ; Inc., "PRISMIQ Media Player User Guide", 2003, 44 pages.

Rothermel K., et al., "An Adaptive Stream Synchronization Protocol," 5th International Workshop on Network and Operating System Support for Digital Audio and Video, 1995, 13 pages.

Schulzrinne H., et al., "RTP: A Transport Protocol for Real-Time Applications, RC 3550," Network Working Group, 2003, pp. 1-89.

The MPEG-2 Transport Stream. Retrieved from the Internet< URL: http://www.coolstf.com/mpeg/#ts>, 5 pages.

"UPnP; "Universal Plug and Play Device Architecture"; Jun. 8, 2000; version 1.0; Microsoft Corporation; pp. 1-54".

"Yamaha DME 32 manual": copyright 2000, 296 pages.

Blakowski G. et al., "A Media Synchronization Survey: Reference Model, Specification, and Case Studies," IEE Journal on Selected Areas in Communications, vol. 14, No. 1, Jan. 1996, 31 pages.

Extended European Search Report, issued by the European Patent Office in connection with European Patent Application No. 13184747.7 on Feb. 28, 2014, 7 pages.

Final Office Action, issued by the United States Patent and Trademark Office in connection with U.S. Appl. No. 13/298,090 on Jul. 3, 2012, 40 pages.

Final Rejection issued by the United States Patent and Trademark Office in connection with U.S. Appl. No. 11/906,702 on Jan. 21, 2010, 26 pages.

Non-Final Office Action issued by the United States Patent and Trademark Office in connection with U.S. Appl. No. 14/184,522 on May 1, 2014.

Non-Final Office Action issued by the United States Patent and Trademark Office in connection with U.S. Appl. No. 13/827,653 on Dec. 5, 2013, 27 pages.

Non-Final Office Action issued by the United States Patent and Trademark Office in connection with U.S. Appl. No. 13/705,176 on May 6, 2014, 22 pages.

Non-Final Office Action issued by the United States Patent and Trademark Office in connection with U.S. Appl. No. 14/184,528 on May 12, 2014.

Non-Final Office Action issued by the United States Patent and Trademark Office in connection with U.S. Appl. No. 13/848,932 on May 14, 2014, 13 pages.

Non-Final Office Action issued by the United States Patent and Trademark Office in connection with U.S. Appl. No. 13/724,048 on Mar. 19, 2013, 8 pages.

Non-Final Office Action issued by the United States Patent and Trademark Office in connection with U.S. Appl. No. 13/204,511 on Apr. 30, 2012, 15 pages.

Non-Final Office Action issued by the United States Patent and Trademark Office in connection with U.S. Appl. No. 13/724,048 on Jul. 30, 2013, 7 pages.

Non-Final Office Action issued by the United States Patent and Trademark Office in connection with U.S. Appl. No. 11/906,702 on Aug. 20, 2009, 27 pages.

Notice of Allowance issued by the United States Patent and Trademark Office in connection with U.S. Appl. No. 13/827,653 on Mar. 6, 2014, 15 pages.

Notice of Allowance issued by the United States Patent and Trademark Office in connection with U.S. Appl. No. 11/906,702 on Nov. 10, 2011, 17 pages.

(56) References Cited

OTHER PUBLICATIONS

Notice of Allowance issued by the United States Patent and Trademark Office in connection with U.S. Appl. No. 13/724,048 on Nov. 13, 2013, 7 pages.
Notice of Allowance issued by the United States Patent and Trademark Office in connection with U.S. Appl. No. 13/298,090 on Jan. 31, 2013, 18 pages.
Notice of Allowance issued by the United States Patent and Trademark Office in connection with U.S. Appl. No. 13/204,511 on Oct. 5, 2012, 5 pages.
Final Office Action, issued by the United States Patent and Trademark Office in connection with U.S. Appl. No. 13/907,666 on Jun. 5, 2014, 12 pages.
Non-Final Office Action issued by the United States Patent and Trademark Office in connection with U.S. Appl. No. 13/298,090 on Jan. 5, 2012, 40 pages.
Non-Final Office Action issued by the United States Patent and Trademark Office in connection with U.S. Appl. No. 14/176,808 on Jun. 17, 2014, 6 pages.
Non-Final Office Action issued by the United States Patent and Trademark Office in connection with U.S. Appl. No. 13/907,666 on Dec. 18, 2013, 12 pages.
Non-Final Office Action issued by the United States Patent and Trademark Office in connection with U.S. Appl. No. 14/186,850 on May 27, 2014, 13 pages.
Yamaha Corporation, "Yamaha DME Designer software manual," Pro Audio & Digital Musical Instrument Division, 2004, 482 pages.
Advisory Action, issued by the United States Patent and Trademark Office in connection with U.S. Appl. No. 10/816217 on Sep. 18, 2008, 8 pages.
Decision of Rejection, issued by the Japanese Intellectual Property Office in connection with Japanese Patent Application No. 2012-178711, on Jul. 4, 2014, 3 pages.
Office Action Summary, issued by the Intellectual Property Office of Japan, in connection with Japanese application No. 2012-178711, on Nov. 19, 2013, 5 pages.
Non-Final Office Action, issued by the United States Patent and Trademark Office in connection with U.S. Appl. No. 11/801468 on Apr. 19, 2010, 16 pages.
Non-Final Office Action, issued by the United States Patent and Trademark Office in connection with U.S. Appl. No. 14/184526 on Jul. 25, 2014, 9 pages.
Non-Final Office Action, issued by the United States Patent and Trademark Office in connection with U.S. Appl. No. 11/801,468, Nov. 29, 2010, 17 pages.
Notice of Allowance and Fee(s) Due, issued by the United States Patent and Trademark Office in connection with U.S. Appl. No. 11/801,468 on May 6, 2011, 10 pages.
Advisory Action, issued by the United States Patent and Trademark Office in connection with U.S. Appl. No. 13/848,932, on Mar. 2, 2015, 3 pages.
Advisory Action, issued by the United States Patent and Trademark Office in connection with U.S. Appl. No. 14/184,528, on Feb. 26, 2015, 3 pages.
Final Rejection, issued by the United States Patent and Trademark Office in connection with U.S. Appl. No. 14/184,526 on Feb. 11, 2015, 13 pages.
Final Rejection, issued by the United States Patent and Trademark Office in connection with U.S. Appl. No. 14/184,935 on Feb. 11, 2015, 17 pages.
Final Rejection, issued by the United States Patent and Trademark Office in connection with U.S. Appl. No. 14/184,522 on Feb. 12, 2015, 20 pages.
International Preliminary Report on Patentability and Written Opinion, issued by the International Searching Authority in connection with International patent application No. PCT/US2013/046372, mailed on Dec. 31, 2014, 5 pages.
Office Action, issued by the United States Patent and Trademark Office in connection with U.S. Appl. No. 14/186,850, on Feb. 26, 2015, 25 pages.
Office Action, issued by the United States Patent and Trademark Office in connection with U.S. Appl. No. 14/504,812 on Jan. 30, 2015, 13 pages.
Office Action, issued by the United States Patent and Trademark Office in connection with U.S. Appl. No. 14/290,493 on Jan. 30, 2015, 29 pages.
Final Rejection, issued by the United States Patent and Trademark Office in connection with U.S. Appl. No. 13/864,251 on Mar. 3, 2015, 13 pages.
Office Action, issued by the United States Patent and Trademark Office in connection with U.S. Appl. No. 14/184,528, on Mar. 26, 2015, 18 pages.
Final Rejection, issued by the United States Patent and Trademark Office in connection with U.S. Appl. No. 13/848,904, on Mar. 4, 2015, 16 pages.
Final Rejection, issued by the United States Patent and Trademark Office in connection with U.S. Appl. No. 13/888,203 on Mar. 5, 2015, 13 pages.
Final Rejection, issued by the United States Patent and Trademark Office in connection with U.S. Appl. No. 14/516,867 on Mar. 9, 2015, 14 pages.
Office Action, issued by the United States Patent and Trademark Office in connection with U.S. Appl. No. 13/705,174, on Mar. 12, 2015, 13 pages.
Office Action, issued by the United States Patent and Trademark Office in connection with U.S. Appl. No. 13/705,177, on Mar. 13, 2015, 15 pages.
Office Action, issued by the United States Patent and Trademark Office in connection with U.S. Appl. No. 13/705,178, on Mar. 27, 2015, 14 pages.
Office Action, issued by the United States Patent and Trademark Office in connection with U.S. Appl. No. 13/435,776, on Mar. 4, 2015, 16 pages.
First Action Interview Pilot Program Pre-Interview Communication, issued by the United States Patent and Trademark Office in connection with U.S. Appl. No. 14/505,027, on Mar. 10, 2015, 4 pages.
Advisory Action mailed on Nov. 12, 2014, issued by the United States Patent and Trademark Office in connection with U.S. Appl. No. 13/907,666, 6 pages.
Advisory Action mailed on Nov. 26, 2014, issued by the United States Patent and Trademark Office in connection with U.S. Appl. No. 14/186,850, 9 pages.
Advisory Action mailed on Jan. 8, 2015, issued by the United States Patent and Trademark Office in connection with U.S. Appl. No. 13/705,176, 4 pages.
Crown "Networked PIP Series Reference Manual," 2008, 68 pages.
Final Office Action mailed on Dec. 3, 2014, issued by the United States Patent and Trademark Office in connection with U.S. Appl. No. 14/184,528, 12 pages.
Final Office Action mailed on Jan. 7, 2015, issued by the United States Patent and Trademark Office in connection with U.S. Appl. No. 13/848,932, 14 pages.
Non-Final Office Action mailed on Dec. 1, 2014, issued by the United States Patent and Trademark Office in connection with U.S. Appl. No. 14/516,867, 11 pages.
Non-Final Office Action mailed on Nov. 17, 2014, issued in connection with U.S. Appl. No. 13/864,247, 11 pages.
Non-Final Office Action mailed on Nov. 18, 2014, issued by the United States Patent and Trademark Office in connection with U.S. Appl. No. 13/435,739, 10 pages.
Non-Final Office Action mailed on Nov. 19, 2014, issued by the United States Patent and Trademark Office in connection with U.S. Appl. No. 13/848,921, 9 pages.
Renkus-Heinz "ST-STX Series Manual," 2002, 6 pages.
International Preliminary Report on Patentability and Written Opinion, issued by the International Searching Authority in connection with International patent application No. PCT/US2013/046386, mailed on Jan. 8, 2015, 8 pages.
Bluetooth, "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1081 pages.

(56) References Cited

OTHER PUBLICATIONS

Dell, Inc., "Dell Digital Audio Receiver: Reference Guide," Jun. 2000, 70 pages.
Dell, "Start Here," Jun. 2000, 2 pages.
Jones. Stephen. "Dell Digital Audio Receiver: Digital upgrade for your analog stereo," Analog Stereo. Jun. 24, 2000, <http://www.reviewsonline.com/articles/961906864.htm> retrieved Jun. 18, 2014, 2 pages.
"Louderback, Jim, "Affordable Audio Receiver Furnishes Homes With MP3," Tech TV Vault, Jun. 28, 2000, <http://www.g4tv.com/articles/17923/affordable-audio-receiver-furnishes-homes-with-mp3/> retrieved Jul. 10, 2014, 2 pages".
Palm, Inc. "Handbook for the Palm VII Handheld," May 2000, 311 pages.
Apple. "Welcome. You're watching Apple TV," Apple TV 1st Generation Setup Guide, Apr. 18, 2008 <http://manuals.info.apple.com/MANUALS/0/MA403/en_SetupGuide.pdf> retrieved Oct. 14, 2014, 40 pages.
Apple. "Welcome. You're watching Apple TV," Apple TV 2nd Generation Setup Guide, Mar. 10, 2011 <http://manuals.info.apple.com/MANUALS/1000/MA1555/en_US/Apple_TV_2nd_gen_Setup_Guide.pdf> retrieved Oct. 16, 2014, 36 pages.
Apple. "Welcome. You're watching Apple TV," Apple TV 3rd Generation Setup Guide, Mar. 16, 2012 <http://manuals.info.apple.com/MANUALS/1000/MA1607/en_US/apple_tv_3rd_gen_setup.pdf> retrieved Oct. 16, 2014, 36 pages.
Higgins et al., "Presentations at WinHEC 2000," May 2000, 138 pages.
Advisory Action issued by the United States Patent and Trademark Office in connection with U.S. Appl. No. 13/907,666 on Sep. 5, 2014, 3 pages.
Final Rejection, issued by the United States Patent and Trademark Office in connection with U.S. Appl. No. 14/186,850, on Oct. 22, 2014, 12 pages.
Final Rejection, issued by the United States Patent and Trademark Office in connection with U.S. Appl. No. 13/705,176, on Oct. 23, 2014, 23 pages.
Office Action, issued by the United States Patent and Trademark Office in connection with U.S. Appl. No. 14/184,935, on Jul. 25, 2014, 11 pages.
Office Action, issued by the United States Patent and Trademark Office in connection with U.S. Appl. No. 13/848,904, on Oct. 23, 2014, 11 pages.
Office Action, issued by the United States Patent and Trademark Office in connection with U.S. Appl. No. 13/864,251, on Oct. 23, 2014, 11 pages.
Office Action, issued by the United States Patent and Trademark Office in connection with U.S. Appl. No. 13/888,203, on Oct. 23, 2014, 9 pages.
Office Action, issued by the United States Patent and Trademark Office in connection with U.S. Appl. No. 13/435,776, on Oct. 24, 2014, 14 pages.
Notice of Allowance and Fee(s) Due, issued by the United States Patent and Trademark Office in connection with U.S. Appl. No. 14/176,808, on Sep. 25, 2014, 5 pages.
European Extended Search Report issued by the European Patent Office in connection with European Patent Application No. 14181454.1 on Mar. 31, 2015, 9 pages.
Advisory Action, issued by the United States Patent and Trademark Office in connection with U.S. Appl. No. 14/184,526, on Apr. 15, 2015, 9 pages.
Advisory Action , issued by the United States Patent and Trademark Office in connection with U.S. Appl. No. 14/184,935, on Apr. 15, 2015, 9 pages.
Final Office Action, issued by the United States Patent and Trademark Office in connection with U.S. Appl. No. 14/186,850, on Apr. 28, 2015, 20 pages.
Notice of Allowance, issued by the United States Patent and Trademark Office in connection with U.S. Appl. No. 13/907,666, on May 19, 2015, 7 pages.
Re-Exam Non-Final Office Action, issued by the United States Patent and Trademark Office in connection with U.S. Appl. No. 90/013,423, on Apr. 22, 2015, 16 pages.
Baldwin, Roberto, "How-To: Setup iTunes DJ on Your Mac and iPhone", available at http://www.maclife.com/article/howtos/howto_setup_itunes_dj_your_mac_and_iphone, archived on Mar. 17, 2009, 4 pages.
United States Patent and Trademark Office, "Advisory Action," issued in connection with U.S. Appl. No. 14/516,867, mailed on Jun. 1, 2015, 11 pages.
United States Patent and Trademark Office, "Final Office Action," issued in connection with U.S. Appl. No. 14/184,522, mailed on Jun. 15, 2015, 25 pages.
United States Patent and Trademark Office, "Non-Final Office Action," issued in connection with U.S. Appl. No. 13/848,932, mailed on Jun. 12, 2015, 16 pages.
United States Patent and Trademark Office, "Non-Final Office Action," issued in connection with U.S. Appl. No. 13/705,176, mailed on Jun. 23, 2015, 30 pages.
United States Patent and Trademark Office, "Non-Final Office Action," issued in connection with U.S. Appl. No. 14/564,544, mailed on Jun. 3, 2015, 7 pages.
United States Patent and Trademark Office, "Non-Final Office Action," issued in connection with U.S. Appl. No. 13/871,795, mailed on Jun. 4, 2015, 16 pages.
United States Patent and Trademark Office, "Notice of Allowance," issued in connection with U.S. Appl. No. 13/848,904, mailed on Jul. 2, 2015, 17 pages.
United States Patent and Trademark Office, "Notice of Allowance," issued in connection with U.S. Appl. No. 13/888,203, mailed on Jul. 2, 2015, 19 pages.
United States Patent and Trademark Office, "Notice of Allowance," issued in connection with U.S. Appl. No. 14/184,935, mailed on Jul. 2, 2015, 23 pages.
United States Patent and Trademark Office, "Notice of Allowance," issued in connection with U.S. Appl. No. 13/297,000, mailed on Jul. 6, 2015, 24 pages.
"Notice of Allowance mailed on Sep. 21, 2015, issued in connection with U.S. Appl. No. 13/297,000, filed Nov. 15, 2011, 11 pages."
"Notice of Allowance mailed on Sep. 22, 2015, issued in connection with U.S. Appl. No. 13/888,203, filed May 6, 2013, 7 pages".
"Notice of Allowance mailed on Sep. 24, 2015, issued in connection with U.S. Appl. No. 13/705,174, filed Dec. 5, 2012, 7 pages."
"Notice of Allowance mailed on Sep. 24, 2015, issued in connection with U.S. Appl. No. 14/184,935, filed Feb. 20, 2014, 7 pages".
"Notice of Allowance mailed on Aug. 27, 2015, issued in connection with U.S. Appl. No. 13/705,177, filed Dec. 5, 2012, 34 pages."
"Notice of Allowance mailed on Aug. 27, 2015, issued in connection with U.S. Appl. No. 14/505,027, filed Oct. 2, 2014, 18 pages."
"Notice of Allowance mailed on Sep. 3, 2015, issued in connection with U.S. Appl. No. 13/705,174, filed Dec. 5, 2012, 4 pages."
"Notice of Rejection issued on Sep. 15, 2015 in connection with Japanese Patent Application No. 2014-220704, 7 pages".
"Advisory Action mailed on Jul. 28, 2015, issued in connection with U.S. Appl. No. 14/184,522, filed Feb. 19, 2014, 7 pages".
"Baudisch et al., "Flat Volume Control: Improving Usability by Hiding the Volume Control Hierarchy in the User Interface", 2004, 8 pages."
"Chakrabarti et al., "A Remotely Controlled Bluetooth Enabled Environment", IEEE, 2004, pp. 77-81."
"Schmandt et al., "Impromptu: Managing Networked Audio Applications for Mobile Users", 2004, 11 pages."
"Final Office Action mailed on Aug. 10, 2015, issued in connection with U.S. Appl. No. 14/290,493, filed May 29, 2014, 26 pages."
"Final Office Action mailed on Aug. 11, 2015, issued in connection with U.S. Appl. No. 13/864,247, filed Apr. 17, 2013, 15 pages".
"Final Office Action mailed on Jul. 15, 2015, issued in connection with U.S. Appl. No. 14/504,812, filed Oct. 2, 2014, 18 pages".
"Final Office Action mailed on Aug. 3, 2015, issued in connection with U.S. Appl. No. 13/848,921, filed Mar. 22, 2013, 13 pages".
"Fulton et al., "The Network Audio System: Make Your Application Sing (As Well As Dance)!", The X Resource, 1994, 14 pages."

(56) References Cited

OTHER PUBLICATIONS

"Hans et al., "Interacting with Audio Streams for Entertainment and Communication", 2003, 7 pages."
"Levergood et al., "AudioFile: A Network—Transparent System for Distributed Audio Applications", Digital Equipment Corporation, 1993, 109 pages."
"Notice of Allowance mailed on Aug. 10, 2015, issued in connection with U.S. Appl. No. 13/848,904, filed Mar. 22, 2013, 9 pages".
"Notice of Allowance mailed on Aug. 12, 2015, issued in connection with U.S. Appl. No. 13/435,739, filed Mar. 30, 2012, 27 pages".
"Notice of Allowance mailed on Jul. 13, 2015, issued in connection with U.S. Appl. No. 14/184,526, filed Feb. 19, 2014, 22 pages".
"Notice of Allowance mailed on Jul. 15, 2015, issued in connection with U.S. Appl. No. 13/705,174, filed Dec. 5, 2012, 18 pages".
"Notice of Allowance mailed on Jul. 17, 2015, issued in connection with U.S. Appl. No. 13/864,251, filed Apr. 17, 2013, 20 pages".
"Notice of Allowance mailed on Jul. 29, 2015, issued in connection with U.S. Appl. No. 13/359,976, filed Jan. 27, 2012, 28 pages".
"Notice of Allowance mailed on Jul. 29, 2015, issued in connection with U.S. Appl. No. 14/186,850, filed Feb. 21, 2014, 9 pages".
"Notice of Allowance mailed on Jul. 30, 2015, issued in connection with U.S. Appl. No. 13/705,178, filed Dec. 5, 2012, 18 pages".
"Notice of Allowance mailed on Aug. 4, 2015, issued in connection with U.S. Appl. No. 14/516,867, filed Oct. 17, 2014, 13 pages".
"Notice of Allowance mailed on Aug. 5, 2015, issued in connection with U.S. Appl. No. 13/435,776, filed Mar. 30, 2012, 26 pages".
"Nutzel et al., "Sharing Systems for Future HiFi Systems", IEEE, 2004, 9 pages."
"Re-Exam Final Office Action mailed on Aug. 5, 2015, issued in connection with U.S. Appl. No. 90/013,423, filed Jan. 5, 2015, 25 pages."
Corrected Notice of Allowance mailed on Aug. 19, 2015, issued in connection with U.S. Appl. No. 13/907,666, filed May 31, 2013, 2 pages.
Advisory Action mailed on Feb. 10, 2016, issued in connection with U.S. Appl. No. 13/871,795, filed Apr. 26, 2013, 3 pages.
European Extended Search Report mailed Mar. 7, 2016, issued in connection with EP Application No. 13810340.3, 9 pages.
Final Office Action mailed on Feb. 24, 2016, issued in connection with U.S. Appl. No. 13/871,795, filed Apr. 26, 2013, 28 pages.
Horwitz, Jeremy, "Logic3 i-Station25," retrieved from the Internet: http://www.ilounge.com/index.php/reviews/entry/logic3-i-station25/, last visited Dec. 17, 2013, 5 pages.
International Bureau, International Preliminary Search Report mailed on Jan. 30, 2014, issued in connection with International Application No. PCT/US2012/045894, 6 pages.
International Searching Authority, International Search Report for Application No. PCT/US2012/045894, mailed Dec. 26, 2012, 3 pages.
International Searching Authority, Written Opinion mailed on Dec. 26, 2012, issued in connection with International Application No. PCT/US2012/045894, filed on Jul. 9, 2012, 4 pages.
Japanese Intellectual Property Office, Office Action Summary mailed on Feb. 2, 2016, issued in connection with Japanese Patent Application No. 2015-520286, 6 pages.

Japanese Patent Office, Notice of Rejection, mailed on Feb. 3, 2015, issued in connection with Japanese Patent Application No. 2014-521648, 7 pages.
Roland Corporation, "Roland announces BA-55 Portable PA System," press release, Apr. 6, 2011, 2 pages.
Advisory Action mailed on Jan. 5, 2012, issued in connection with U.S. Appl. No. 12/035,112, filed Feb. 21, 2008, 3 pages.
Advisory Action mailed on Sep. 28, 2009, issued in connection with U.S. Appl. No. 10/816,217, filed Apr. 1, 2004, 4 pages.
Canadian Intellectual Property Office, Canadian Office Action mailed on Sep. 14, 2015, issued in connection with Canadian Patent Application No. 2,842,342, 2 pages.
"Creative, "Connecting Bluetooth Devices with Creative D200," http://support.creative.com/kb/ShowArticle.aspx?url=http://ask.creative.com:80/SRVS/CGI-BIN/WEBCGI.EXE/,/?St=106,E=0000000000396859016,K=9377,Sxi=8, VARSET=ws:http://us.creative.com,case=63350>, available on Nov. 28, 2011, 2 pages".
"Final Office Action mailed on Oct. 13, 2011, issued in connection with U.S. Appl. No. 12/035,112, filed Feb. 21, 2008, 10 pages."
First Action Interview Office Action Summary mailed on Apr. 15, 2015, issued in connection with U.S. Appl. No. 14/505,027, filed Oct. 2, 2014, 6 pages.
"Non-Final Office Action mailed on Mar. 10, 2011, issued in connection with U.S. Appl. No. 12/035,112, filed Feb. 21, 2008, 12 pages."
"Non-Final Office Action mailed on Feb. 18, 2009, issued in connection with U.S. Appl. No. 10/861,653, filed Jun. 5, 2004, 18 pages."
"Non-Final Office Action mailed on Jun. 27, 2008, issued in connection with U.S. Appl. No. 10/861,653, filed Jun. 5, 2004, 19 pages."
"Non-Final Office Action mailed on Dec. 28, 2015, issued in connection with U.S Appl. No. 14/290,493, filed May 29, 2014, 29 pages."
Notice of Allowance mailed on Oct. 7, 2015, issued in connection with U.S. Appl. No. 14/184,526, filed Feb. 19, 2014, 7 pages.
Notice of Allowance mailed on Oct. 9, 2015, issued in connection with U.S. Appl. No. 13/435,739, filed Mar. 30, 2012, 4 pages.
"Notice of Allowance mailed on Oct. 13, 2015, issued in connection with U.S. Appl. No. 13/864,251, filed Apr. 17, 2013, 7 pages."
"Notice of Allowance mailed on Jun. 14, 2012, issued in connection with U.S. Appl. No. 12/035,112, filed Feb. 21, 2008, 9 pages."
"Notice of Allowance mailed on Jun. 16, 2009, issued in connection with U.S. Appl. No. 10/861,653, filed Jun. 5, 2004, 11 pages."
Advisory Action mailed Feb. 2, 2016, issued in connection with U.S. Appl. No. 13/848,921, filed Mar. 22, 2013, 8 pages.
Advisory Action mailed on Feb. 1, 2016, issued in connection with U.S. Appl. No. 13/864,247, filed Apr. 17, 2013, 6 pages.
Final Office Action mailed on Nov. 30, 2015, issued in connection with U.S. Appl. No. 13/871,795, filed Apr. 26, 2013, 26 pages.
Non-Final Office Action mailed on Jan. 13, 2016, issued in connection with U.S. Appl. No. 14/184,528, filed Feb. 19, 2014, 14 pages.
Notice of Allowance mailed on Jan. 11, 2016, issued in connection with U.S. Appl. No. 14/565,544, filed Dec. 9, 2014, 5 pages.
Non-Final Office Action mailed on Mar. 8, 2016, issued in connection with U.S. Appl. No. 13/848921, filed Mar. 22, 2013, 13 pages.

* cited by examiner

MEDIA PLAYBACK SYSTEM WITH GUEST ACCESS

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
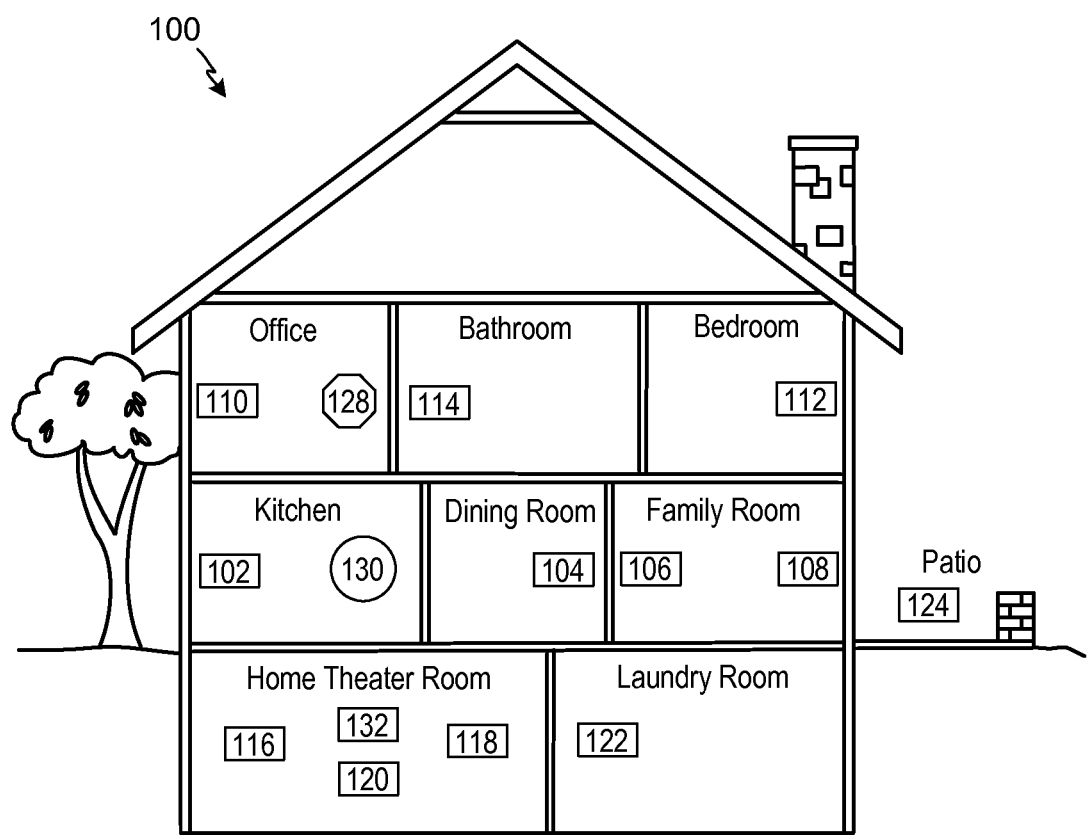
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Listening to audio content out loud can be a social activity that involves family, friends, or both. Audio content may include, for instance, music, talk radio, books, audio from television, and other audible material. For example, in a household, people may play music out loud at parties and other social gatherings. In such an environment, people may wish to play the music in one listening zone or multiple listening zones simultaneously, such that the music in each listening zone may be synchronized, without audible echoes or glitches. Such an experience may be further enriched when people, for example, browse audio sources, add a music track to a playback queue, learn more about a music track (such as track title or track artists), or view what music track is next in the playback queue.

Listening to audio content out loud can also be an individual experience. For example, an individual may play music out loud for themselves in the morning before work, in the evening during dinner, or at other times throughout the day at home, work, or on the road. For these individual experiences, the individual may choose to either use headphones, or limit the out loud playback of audio content to a single zone or area.

Discovery of audio can also be an important element of the experience. By way of illustration, discovery may involve friends sharing their latest favorite new song, artist, or playlist with each other. In some cases, discovery may involve browsing music magazines and periodicals that regularly review the latest releases. In addition, some online music services, radio stations, and disc jockeys are also means for people to share and discover new music or audio.

Example systems, methods, apparatus, and articles of manufacture disclosed herein provide for configuration of a playback system in a restricted access mode (e.g., a party playlist mode) in which authorized or other participating users can access and interact with a certain specified set of content and system function. For example, an authorized user can view a library of available content for playback and select content to be added to the playlist (e.g., perhaps subject to approval of the host/moderator and/or a vote of other participants). Example systems and methods disclosed and described herein may be advantageously used to provide improved usability and configurability for varied playback of media content (e.g., audio and/or video) in a network environment.

Many other embodiments are provided and described herein.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

a. Example Zone Players

Figure 2A:
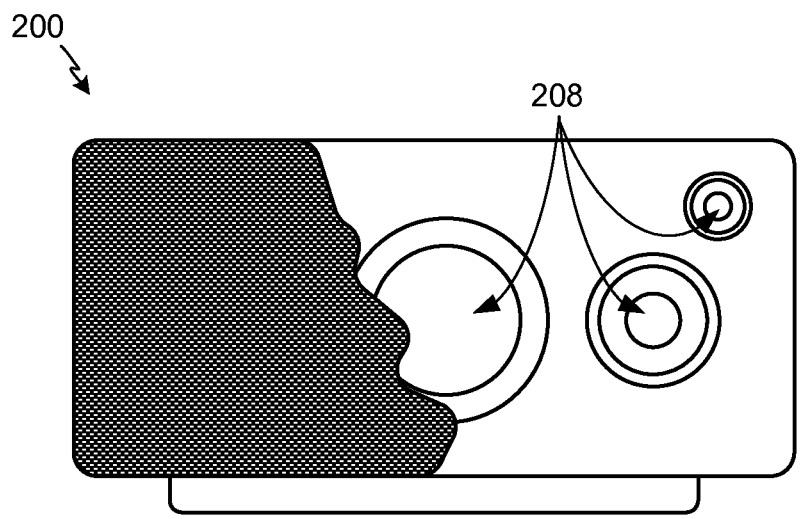
FIG. 2A shows an illustration of an example zone player having a built-in amplifier and speakers.
Figure 2B:
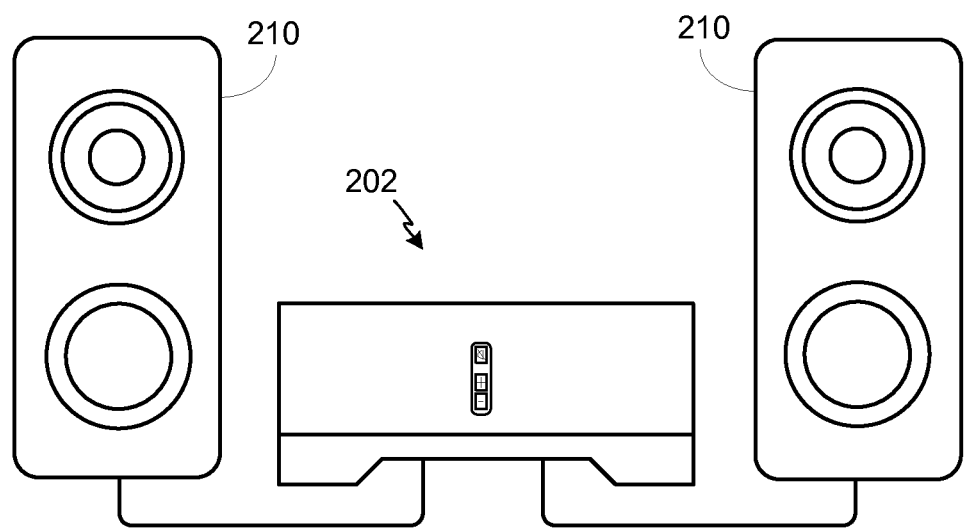
FIG. 2B shows an illustration of an example zone player having a built-in amplifier and connected to external speakers.
Figure 2C:
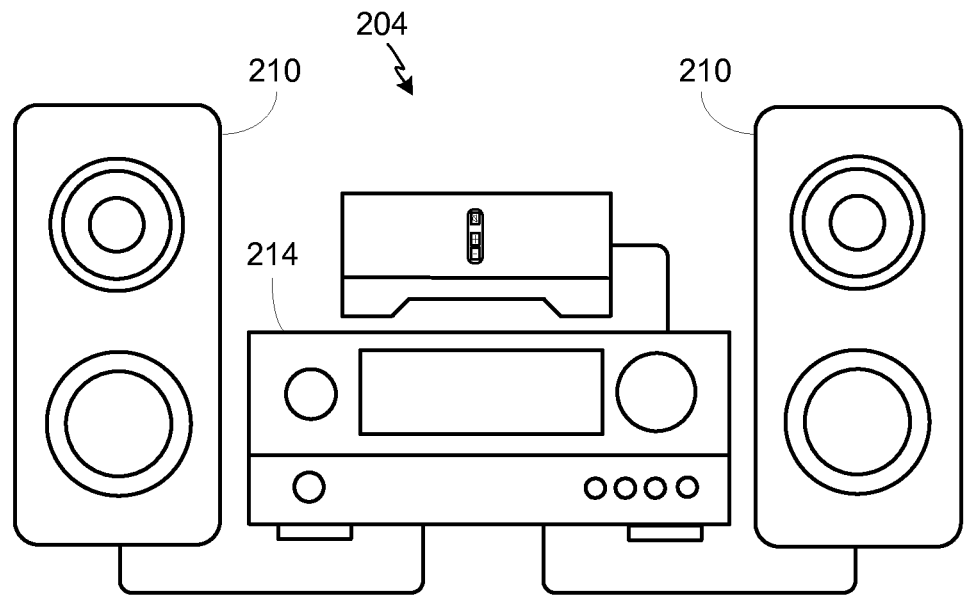
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
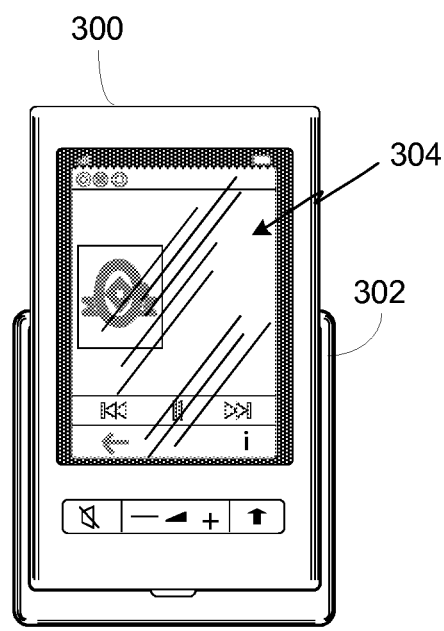
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting state information directly or indirectly from one or more zone players; the state information may provide information about system 100, such as current zone group configuration, what is playing in one or more zones, volume levels, and other items of interest. The state information may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or MAC™ can also be used as controller 130. Such controllers may connect to system 100 through an interface with data network 128, a zone player, a wireless router, or using some other configured connection path. Example controllers offered by SONOS, Inc. of Santa Barbara, Calif. include a "Controller 200," "SONOS® CONTROL," "SONOS® Controller for IPHONE™," "SONOS® Controller for IPAD™," SONOS® Controller for ANDROID™, "SONOS® Controller for MAC or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. Sonsonate represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired, allowing the separate audio channels to be played by different players, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
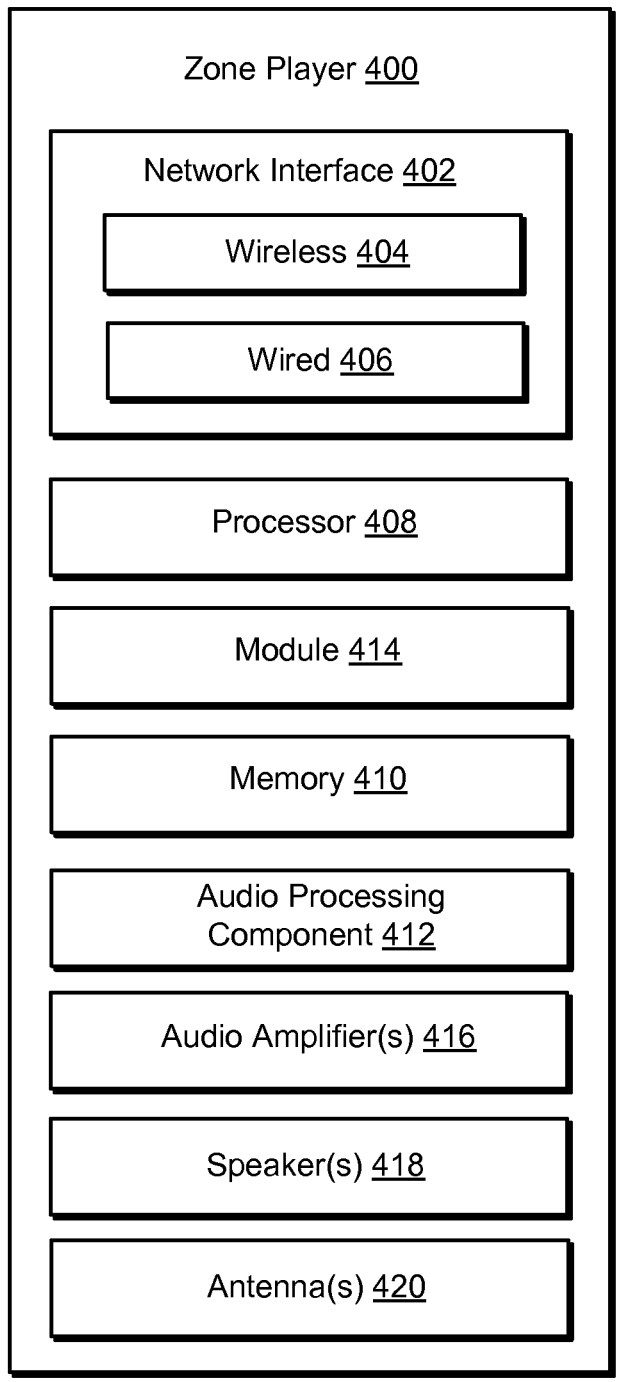
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, but from different channels of audio. Audio from Internet radio stations, online music and video services, downloaded music, analog audio inputs, television, DVD, and so on, can be played from the PLAY:5.

IV. Controller

Figure 5:
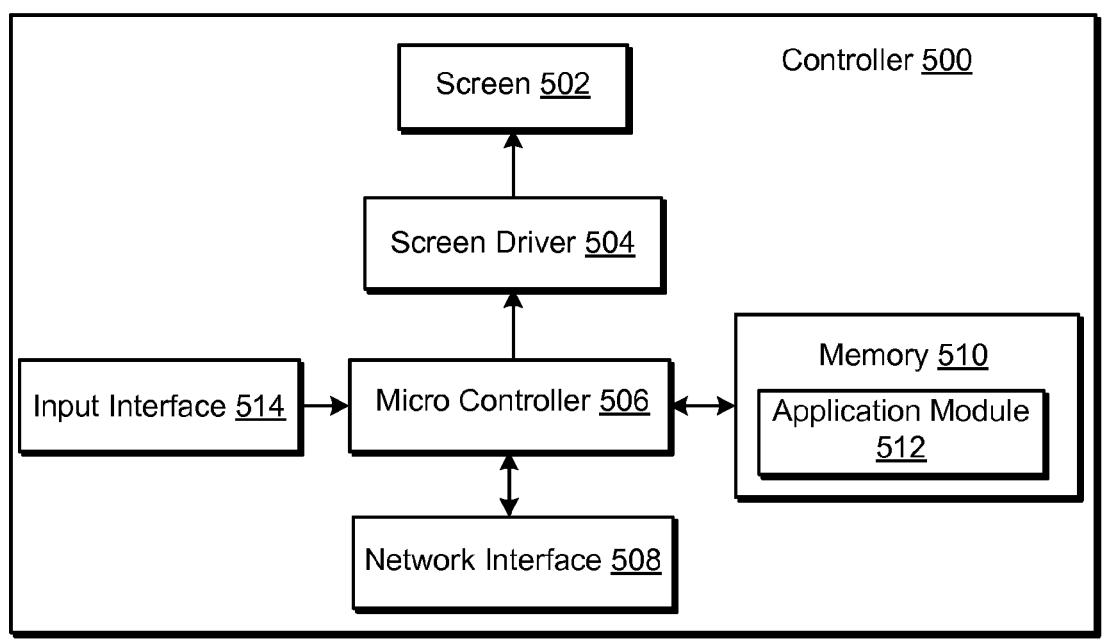
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standard including IEEE 802.11a, 802.11b 802.11g, 802.11n, or 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as state information). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a group or collection of zones referred to as a bonded zone including at least two zone players from the controller 500. The zone players in the bonded zone can play audio in a synchronized fashion, such that all of the zone players in the group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the zone players (e.g., six zone players available in the example above), for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Configuration Systems and Methods

Figure 6:
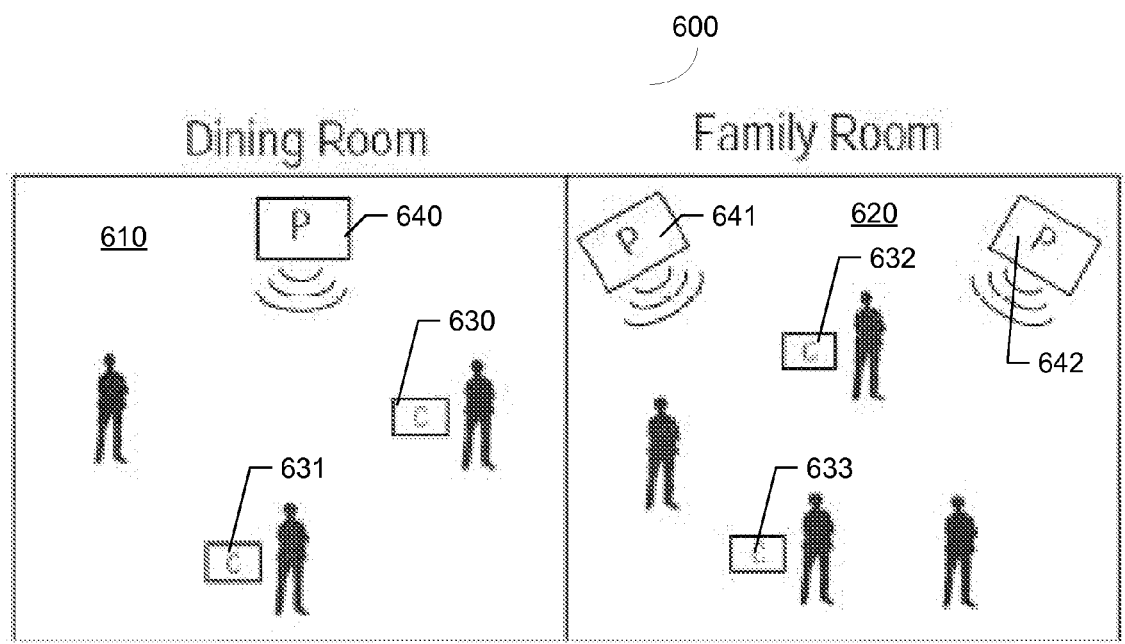
FIG. 6 depicts an example shared listening zone group including multiple zones in which multiple users, via multiple controllers can control music played in the zone group via a plurality of media playback devices.

In an example system such as the ones shown in FIGS. 1 and 6, where multiple users can listen to the same audio content through one or more zone players such as those shown in FIGS. 2 and 4, the ability to provide crowd-sourced playlists and/or facilitate guest access to music services may be valuable.

An example system is shown in FIG. 6, whereby a zone group 600 includes two zones, a Dining Room zone 610 and a Living Room zone 620, in which multiple users, via multiple controllers 630-633, can control the audio that is played in the zone group 600 via a plurality of playback devices 640-642 (e.g., a plurality of zone players and/or other media playback devices such as shown and described in FIGS. 1-4). As shown in the example of FIG. 6, a media playback system can be configured to accept control and/or other input from multiple controllers 630-633, such as a controller 500, a smartphone, a tablet computer, a laptop computer, and/or other controlling device. Control, however, may be limited or otherwise restricted according to system permissions, preferences, etc., set by default, by owner, and so on.

In certain embodiments, a party playlist mode enables users with a phone or other controller (e.g., other device running a controller software application, etc.) that has access to the playback network to control music playback. In some embodiments, playback control includes adding content to a playback system, such as adding content to a playback queue (e.g., party playlist). In other embodiments, playback control includes moderation of content playback, such as moderating the content added to the party playlist. In some embodiments, the party playlist mode can facilitate moderation of content playback to users with a phone or other controller that has access to the playback network. In some embodiments, moderation of content playback can start with a single moderator and evolve to multiple moderators as time evolves (e.g., as the party goes on), for example. In one example embodiment, people with access to the playback network can be notified when new tracks are added and be asked to vote regarding addition of the track to the playlist. In another example embodiment, the order or timing of the newly added track in the playlist can be voted on as well by people with access to the playback network.

In certain embodiments, playlist contributors are identified with the tracks they add and the identification of the contributors is shared with everyone to view. In this way, for example, listeners can know who added which song or track to the party playlist. In one example embodiment, the playlist contributor is not identified until their contribution has been accepted into the party playlist.

Certain embodiments provide guest access to allow participants in the playback system to bring their own content to the system on a temporary basis. For example, people can provide access to their music service accounts, the content on their mobile phones, their content stored in the cloud, and so on, for a temporary basis.

In certain embodiments, duplicate tracks or songs being added to the party playlist can be identified and rejected. For example, multiple users may simultaneously (or substantially simultaneously) add the same song or track to the playlist. To avoid multiple occurrences of the same song or track, the system can automatically reject duplicates.

Certain embodiments provide limited user access to control music playback in a shared environment. In some embodiments limited user access may apply restrictions on an entire media playback system, a single listening zone, and/or a listening zone group. In some example embodiments, limited user access may include restricting playback in certain specified listening zones and/or zone groups. In another example embodiment, limited user access may include restricting playback for a fixed time interval, during a particular time-of-day, and/or on a recurring basis.

In an example embodiment, limited user access includes a party playlist that gives limited access to play control of a particular listening zone and/or group of zones. For example, the party playlist may limit users to only adding songs or tracks to the playlist, whereas other functionality in the listening zone or zone group may be disabled. In another example, the party playlist may allow users to collectively decide (e.g., vote) if a new song or track should be added to the playlist, for example. In another example, the party playlist may also limit system configuration functionality, such as the zone grouping configuration, the music equalization parameters, etc. In some example embodiments, the party playlist may only be in effect for a fixed time duration, and not require explicit disabling operation.

In an example embodiment, limited user access may be applied based on authentication of the user. For example, limited user access may be applied based on authentication of a controlling device which may include registration of the controlling device and its associated identifier. In another example, authentication may include all controller devices used in the media playback system over a defined time interval (e.g., a previous twenty-four (24) hours).

Certain embodiments provide shared music access for a limited time duration in a group listening environment. Shared music may be a library of tracks or a playlist on a physical device that is accessed wirelessly by the media playback system, for example. Shared music may be a subscription service accessed independently over the Internet and/or other network, for example (e.g., a cloud-based storage, music streaming service, etc.). Subscription service credentials may be passed directly to a playback system device, for example. Subscription service may be username/password or token, for example.

While illustrative examples provided below reference music or audio as content provided, video, images and/or other multimedia content may be provided in addition or instead.

Crowd-Sourced Playlist

In some embodiments, one or more users can create a multimedia playlist. For example, a 'party playlist' mode is provided to allow multiple users to add tracks to a queue for playback via a media playback system.

A media playback system can be put into party playlist mode by an authenticated user. In an example, the user is to "sign in" such as by entering a username, a password, or a username/password combination to be authenticated. In another example, the user may be authenticated by identifying a device used to control the system (e.g., the device may be identified by a unique identifier (ID) such as a Media Access Control (MAC) address that has been registered in the playback system). For example, a SONOS™ controller may be considered such a device, or a device with a SONOS™ controller application may be registered as such a device. In another example, "Jonathan's IPHONE™" may be considered such a device if the target playback system is Jonathan's SONOS™ system. In yet another example, devices that have been used with respect to the media playback system within a certain time period (e.g., in a twenty-four (24)-hour period) may be considered registered. Alternatively, the playback system may be put into party playlist mode by anyone with access to the playback system.

The party playlist mode may be set to last for a fixed duration of time (e.g., four (4) hours), for example. The party playlist mode may be set to end at a specific time of day (e.g., 1 am), for example. The party playlist mode may last indefinitely until a user manually exits the mode, for example. In an embodiment, a password is generated when the playback system is put in party playlist mode and is used to exit party playlist mode. In another embodiment, no authentication is required to take the system out of party playlist mode.

Party playlist mode may apply to a single zone or zone grouping, multiple zones or zone groupings, or the entire media playback system, for example.

Once the system is put into party playlist mode, in some embodiments, users can only add music to the listening queue. Deleting tracks, changing the play mode (e.g., shuffle, repeat, etc.), or changing the system settings (e.g., zone group configuration, music equalization parameters, etc.) is not allowed. In some embodiments, some or all of the following rules or limitations are applied: an ability to modify content may be limited, an ability to affect order may be limited, an ability to adjust system configuration may be limited, and so on. For example, rules and/or other access permissions may limit whether anyone can add songs to the party playlist, no one can remove songs from the party playlist, only one song may be added at a time (rather than adding an entire album or set of content in a single action), etc. Artist repetition may be avoided by limiting a number of songs in the queue by the same artist, for example. Songs in the queue may be played randomly and/or in a predefined order, for example. In certain examples, once a song is played, the song is removed from the queue. In certain examples, no user can switch sources or change a zone grouping in party playlist mode. In other examples, certain users may be able to switch sources or change a zone grouping in party playlist mode.

A visual history of recently played tracks can be accessed and shown to users via a control device, for example. In certain embodiments, a graphical "Jukebox" screen can be shown on the control device.

In an embodiment, a method is used to determine if a new track should be added to the playlist. In an embodiment, all tracks are added to the playlist in an unrestricted fashion. In another embodiment, the playlist is moderated by an "owner" of the media playback system. In another embodiment, the playlist is moderated by the crowd or collection of users. For example, when a user attempts to add a track to the playlist, notification is sent to users in the crowd. Notification can be in the form of an application-based notification (e.g., a notification message within a Sonos application), a text message, an instant message, or some other messaging scheme. Any number of users can be selected to participate in the moderation, and the user selection may be at random when a subset of the crowd is selected. Once notification is sent to the users to vote, they are given a fixed time duration (e.g., two (2) minutes) to vote on adding the track to the listening queue. The system can use a majority-rule to determine if the track is added or not. In certain embodiments, certain role(s) (e.g., a disc jockey (DJ), host, organizer, etc.) may have discretion or take priority to add or approve addition of a track to the party playlist, for example.

In an example in which duplicate songs are not allowed, multiple users may try to add the same track or song to the queue. In an embodiment, duplicate tracks are identified by comparing the source location and track identifiers. In another embodiment, duplicate tracks are identified by comparing the metadata (e.g., artist, track name, length of track, etc.) between the tracks. In yet another embodiment, duplicate tracks are identified by comparing the musical composition of both tracks. The comparison may be done directly in the system or via a service hosted locally or in the Internet "cloud", for example.

In an embodiment, the user or users that add a track to the queue are identified for others to see. In an embodiment, the user or users that add the track are identified in the queue alongside the track name. In another embodiment, the user or users that add the track are identified by drilling down (e.g., double-click, touch, hover over, etc.) on the track name.

In an embodiment, authentication mechanisms as described above may be used to identify the user or users that added the track. In another embodiment, the user may be asked to enter a name along with the track to be added.

In an embodiment, the user who added the track to the playlist is notified if the track has been successfully added or rejected from the listening queue.

Guest Access

In an example media playback system, music that is added to the party playlist can come from many different sources. In an embodiment, music can be selected from sources already associated with the playback system. Already-associated sources may include an indexed music library that is on a Local Area Network (e.g., music stored on a PC or MAC™ computer, a network attached storage device, a docked IPOD™ or IPHONE™, or another wired or wireless device that has been indexed as part of the playback system), an indexed music library that is stored in the "cloud" over the Internet (e.g., a cloud-based music storage such as Apple ICLOUD™ or Amazon Cloud Player, etc.), or an Internet music service that provides streaming content over the Internet (e.g., PANDORA™, RHAPSODY™, SPOTIFY™, etc.). In another embodiment, the music can be played to the media playback system (e.g., a SONOS™ system) from a third party software application such as SPOTIFY™ or FACEBOOK™. In another embodiment, the music can be played directly from the device on which the content resides (e.g., music stored on an IPHONE™, IPAD™, IPOD™, or ANDROID™ device).

In another embodiment, a 'guest pass' mode allows users to share their music services with other users in the crowd on a temporary basis. For example, users may want to share their SPOTIFY™ account temporarily if the playback system does not have a SPOTIFY™ account already associated with the system. In another example, users wanting to share a personal playlist may want to share their SPOTIFY™ account temporarily even if the system already has a SPOTIFY™ account associated with it. In an embodiment, guest access requires the guest to be linked to the playback system. In an embodiment, the guest is linked to the playback system using a configuration sequence including a special button press on a system device. When the guest is linked to the playback system as a guest, user credentials (e.g., username/password, token, etc.) are transferred to the playback system from the user in a secure fashion. The user credentials are used to register the playback system with a music service, for example. In an embodiment, the user credentials are passed directly to a media playback system device using wired or wireless communication. In another embodiment, the user credentials are transmitted to a media playback system device from a mobile device by first connecting through the mobile network (e.g., a 3G or 4G network) and then connecting to the playback system through an Internet or other network connection. Guest access may be set to last for a fixed duration of time (e.g., four (4) hours). Guest access may be set to end at a specific time of day (e.g., 1 am). Guest access may last as long as the user is connected to the network, or it may last indefinitely until a user manually exits the mode. In an embodiment, when guest access is terminated, the user credentials are purged from the system.

In certain embodiments, guest credentials (e.g., password) shall not be retrievable from the system. An owner of the account, however, may allow a 'user id' to be displayed by the system on controllers in certain circumstances (e.g., associated with a song playing from their account, similar to above user attribution). In an example, guest access may be terminated via a refutation mechanism that does not require the guest still be attached to the hosting system or on the local network. This could be via an Internet online multimedia authorization protocol (OMAP) or similar protocol using an Internet connection (including a mobile connection), for example.

Restricted Mode

In some embodiments, the example media playback system includes one or more restrictions that limit access to control music playback. Certain embodiments include a 'restricted' mode that limits users to certain functionality. In the example playback system described and disclosed above, the party playlist mode may limit user access to adding tracks to a listening queue, for example. In another example system, users are limited as to a time of day at which they can control the playback of music. In another example system, users are limited as to the zones or zone groups that they can control. For example, in a household with young children, parents may wish to limit their children to playback control only in the living room and the children's bedroom(s). In another example, parents may want to limit their children to playback control only during the hours of 9 am to 7 pm. In another example, parents may want to do both: limit their children to playback control only during the hours of 9 am to 7 pm and also only in the living room and child bedroom(s). In another example system, users are limited to the type of content that they can play. In some embodiments, the content is limited by the playback system using an "explicit" tag embedded in a digital music file. In another embodiment, the content is limited by the system to the location of the source or the streaming service.

In certain embodiments, a user may be limited in a number of tracks that the user can add to the queue. For example, the host can allot or credit the user with a number of tracks to be added, such as by selecting the user's controller from a list of linked controllers, by providing the user with a token or activation code, and so on. Each song added by the user to the party playlist is deducted from the user's allotment or credit, for example. In an embodiment, the host is a business establishment, and the user is a customer of that establishment. The customer can influence the playlist at the establishment as they would with a traditional jukebox, for example.

Example Party Playlist Methods

Figure 7:
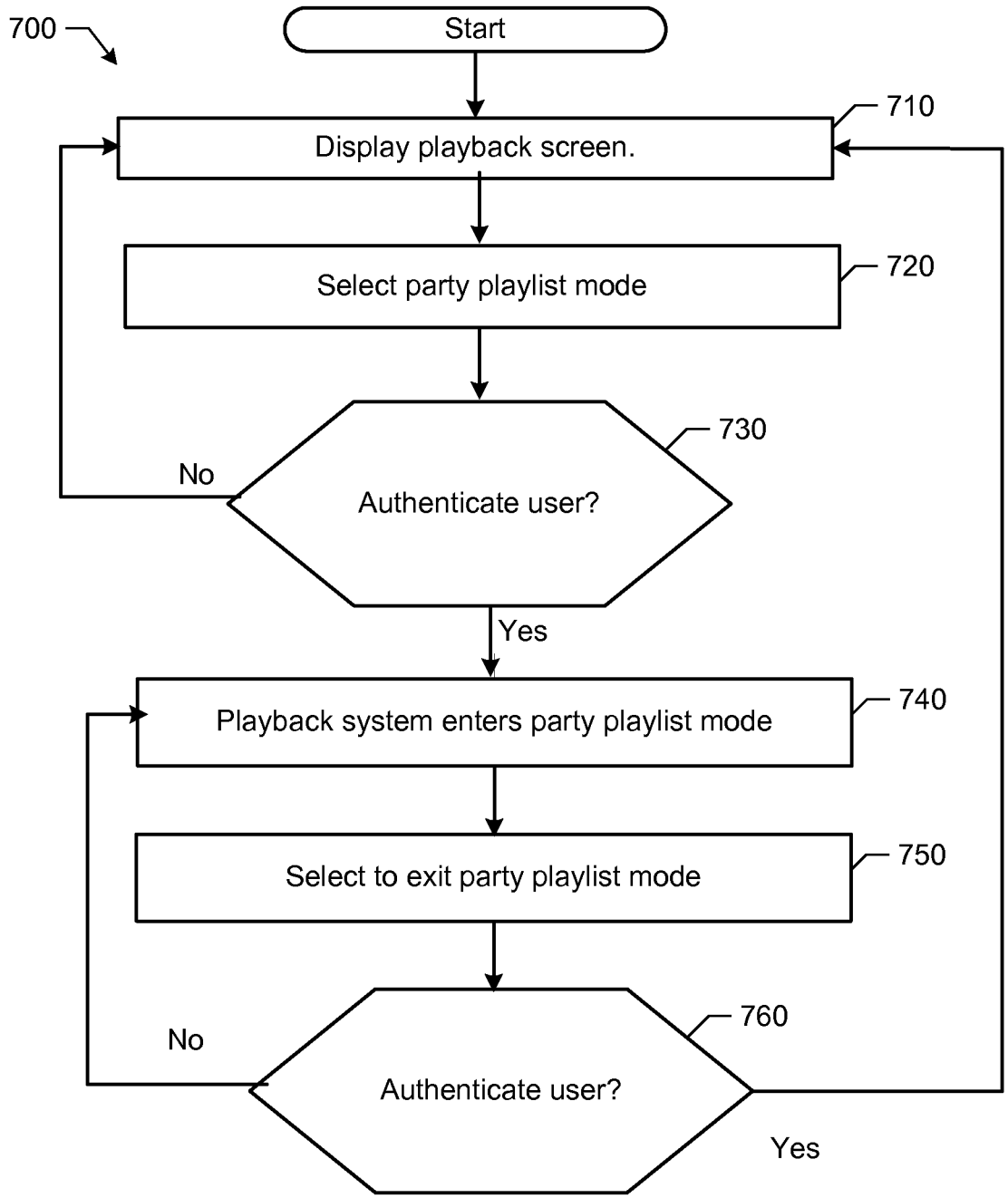
FIG. 7 illustrates a flow diagram of an example method to implement a party playlist mode in a media playback system.

FIG. 7 illustrates a flow diagram of an example method 700 to implement a party playlist mode in a media playback system. At block 710, a playback or "Now Playing" screen is displayed. For example, a listing of a playlist and currently playing song can be displayed via a controller, such as controller 500 (e.g., a controller application running on an IPHONE™, ANDROID™, or IPAD™)

At block 720, a party playlist mode is selected. The mode may be manually selected by a user or selected according to a schedule and/or other automated trigger. For example, the user may select an option via a controller to trigger entry into the party playlist mode. In another example, a user may schedule the party playlist mode to begin at a certain time on a certain day for a party. At block 730, a user is authenticated to determine authorization of that user to enter the party playlist mode. For example, the user is authenticated based on a username and password, token, password alone, biometric identification, and so on. In another example, the user is authenticated based on the identification of the controller that is being used.

At block 740, the media playback system enters party playlist mode. In party playlist mode, user(s) (e.g., all users within range (e.g., at a party), authorized users, etc.) can add content to the party playlist for playback via a local playback system (e.g., a household SONOS™ system local to the party). In certain embodiments, in party playlist mode, user(s) can specify priority/order of content. In certain embodiments, in party playlist mode, user(s) can specify a zone (re)configuration, for example. In certain embodiments, in party playlist mode, user(s) can specify volume and/or other parameters (e.g., in general and/or associated with their particular added track(s)). In certain embodiments, changes made by a user may be subject to approval and/or override (e.g., by a host/owner/administrator, by a vote of participants, etc.).

In certain embodiments, a remote user can add content to the playlist queue. For example, a party host can give a remote user access to modify the party playlist (e.g., the host can message her old college roommate to ask about the song they loved to dance to in college and ask her old roommate to remotely add the song from her collection to the host's playlist, etc.). Remote adding of content to the party playlist can be facilitated by providing a content identifier (e.g., a song name), a copy of the content, etc.

At block 750, an exit from party playlist mode is selected. The mode may be may be manually selected by a user or selected according to a schedule and/or other automated trigger. For example, the user may select an option via a controller to trigger exit from the party playlist mode. In another example, a user may schedule the party playlist mode to end at a certain time on a certain day. At block 760, a user is authenticated to determine authorization of that user to exit the party playlist mode. For example, the user is authenticated based on a username and password, token, password alone, biometric identification, and so on. In another example, the user is authenticated based on the identification of the controller that is being used. Once the playback system has exited the party playlist mode, normal operation of the playback system can resume.

Figure 8:
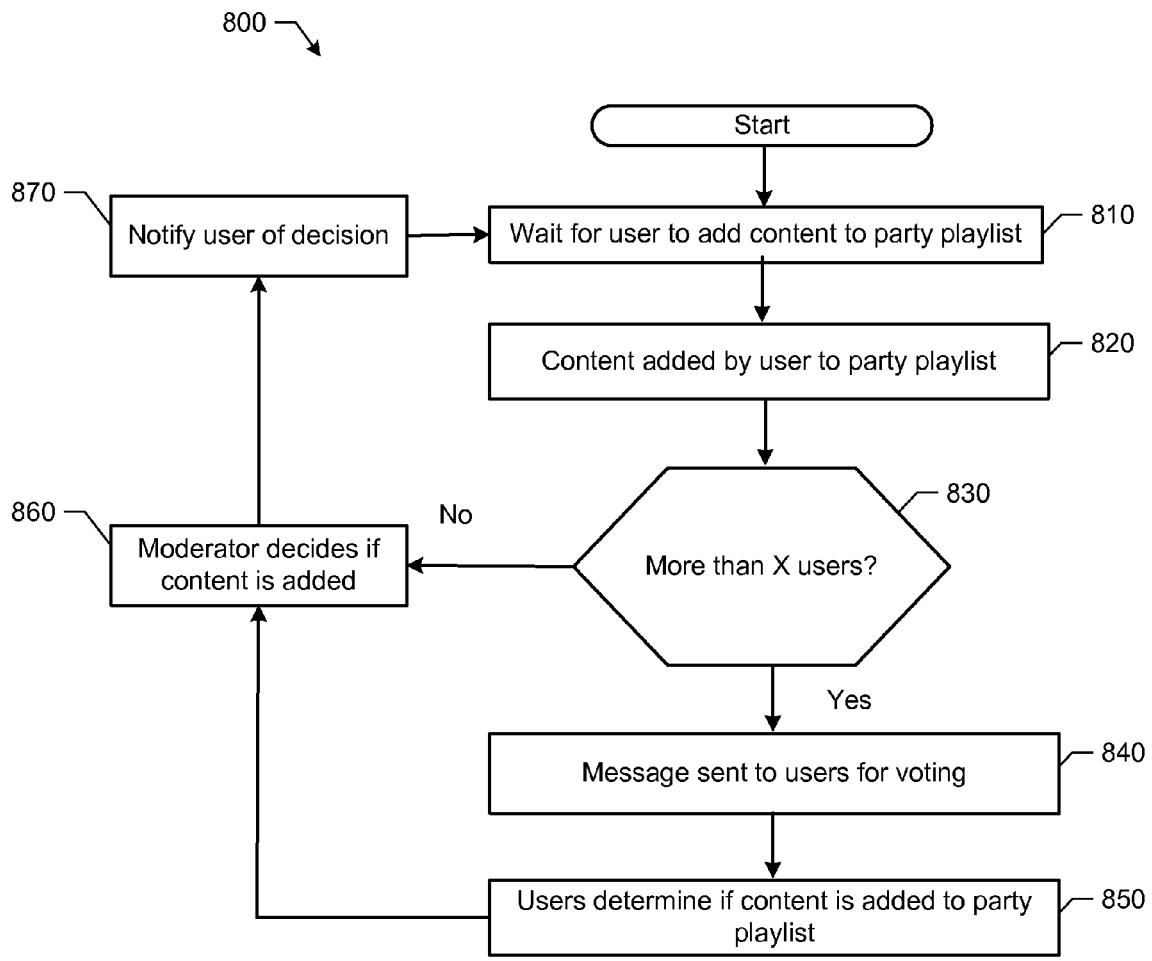
FIG. 8 illustrates a flow diagram of an example method to facilitate addition of content to a party playlist.

FIG. 8 illustrates a flow diagram of an example method 800 to facilitate addition of content to a party playlist. At block 810, the local playback system waits for a user to add content to the party playlist. For example, a guest at a party may be given access to modify the playlist or queue of content for playback via the host's local playback system (e.g., household playback system, nightclub playback system, business playback system, etc.). Guest user access can be validated and/or otherwise authenticated to determine authorization to access the party playlist, for example.

At block 820, content is added by the user to the party playlist. For example, the user utilizes a controller, such as controller 500 (e.g., a controller application running on a smartphone or tablet computer), to browse/search, select, and add content to the party playlist. In certain embodiments, the user is given access (perhaps limited) to the host's content for addition to the playlist. In certain embodiments, the user is able to access his or her own content for referral and/or addition to the playlist. In certain embodiments, the user is able to access one or more streaming and/or cloud-based content services to route content to the party playlist.

At block 830, participating users are identified. For example, if a plurality of people attending a party has access to the party playlist via one or more controllers, the plurality of people are identified as participating users. Participating users may be identified based on controller, user authentication, user registration, activity with respect to the playlist or other part of the local playback system, etc.

At block 840, based on criteria the host provides (e.g., a number of participating (e.g., controlling) users are present above a threshold), then a message is sent to the users to vote. For example, the host can set a threshold above which users can vote on addition and/or other adjustment of content to the party playlist. The number of participating users can be set by default, for example. The number of users may be more than one, for example.

At block 850, the voting users determine if the content is added to the party playlist. For example, each eligible voting user receives a message and request to vote via a controller (e.g., a smartphone or tablet controller application, etc.) associated with that user. In certain embodiments, a voting scheme can be configured, such as a simple majority and/or other voting scheme. In certain embodiments, a moderator, such as a host or disc jockey, can override a user vote.

At block 860, if user voting is not employed, if too few votes are cast, or if the host elects for other reason(s), a moderator (e.g., the host) decides whether the content is to be added to the party playlist. For example, if only one participating user is present and/or the minimum number set in the system is not satisfied, then the moderator/host arbitrates the addition of content to the party playlist. As another example, the moderator/host may override or veto the vote of participating users.

At block 870, the requesting user is notified of the decision regarding the content to be added. Such notification may include comments and/or additional information including, for example, the vote tally, moderator comments, etc. For example, a user attempting to add a song to the party playlist is sent a message notifying him/her regarding whether the song was successfully added or rejected with respect to the party playlist.

The playback system then resumes waiting, in party playlist mode, for a user to request content to be added to the party playlist. Although the example of FIG. 8 has been described with respect to content (e.g., audio, video, and/or other media content), it is understood that the example method 800 can be executed with respect to zone group configuration, volume and/or other parameter settings, and so on for the local playback system in party mode.

Figure 9:
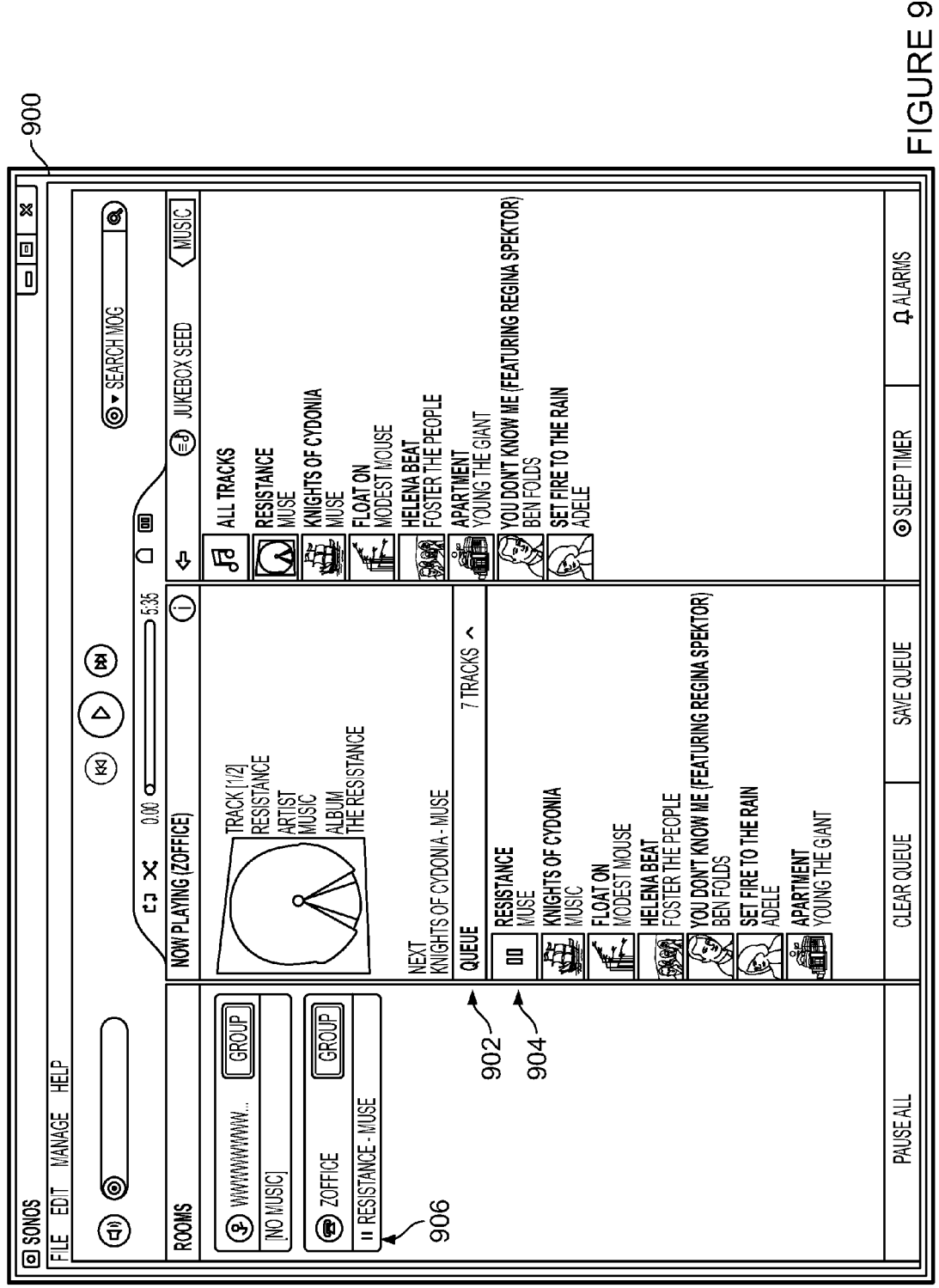
FIGS. 9-15 illustrate example user interfaces facilitating content selection, playback and configuration in a party playlist mode.

FIGS. 9-15 illustrate an example sequence of user interfaces facilitating content selection, playback and configuration in a party playlist mode. As shown in the example of FIG. 9, a user interface 900 includes a list or other set of audio tracks available to be selected for a playlist in a party playlist mode, for example. In FIG. 9, a playback queue can be found at 902. In this example, the playback queue 902 corresponds to the "Office" zone 906. Also in FIG. 9, a play indicator 904 appears to the left of the item currently playing in the playback queue (e.g., currently a pause symbol is shown that indicates the user can pause the play by selecting the symbol). When the current item ends, the next item in the queue starts to play, and play continues through the list until the queue is completed or some other action like "repeat" is selected.

Figure 10:
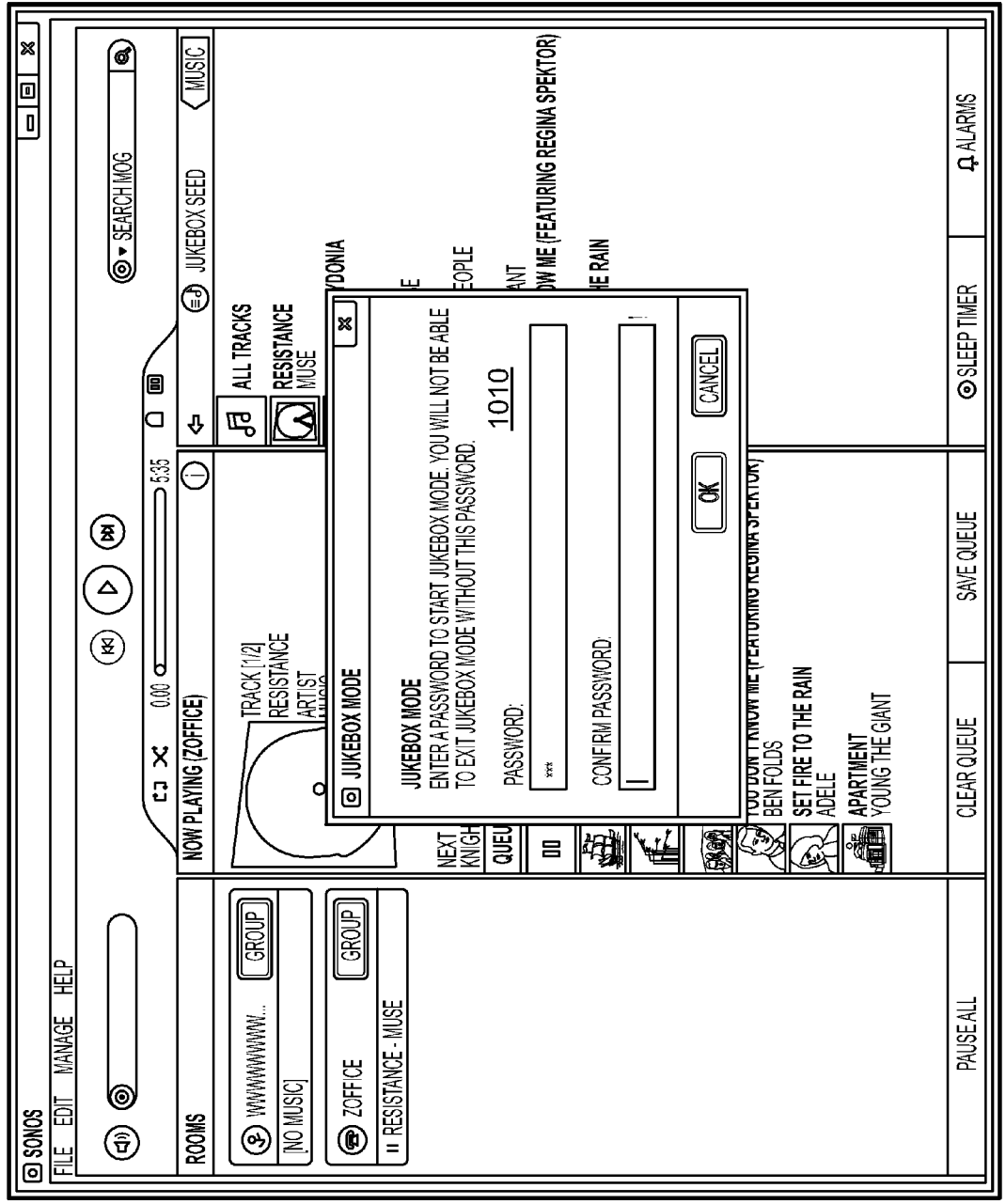
Figure 11:
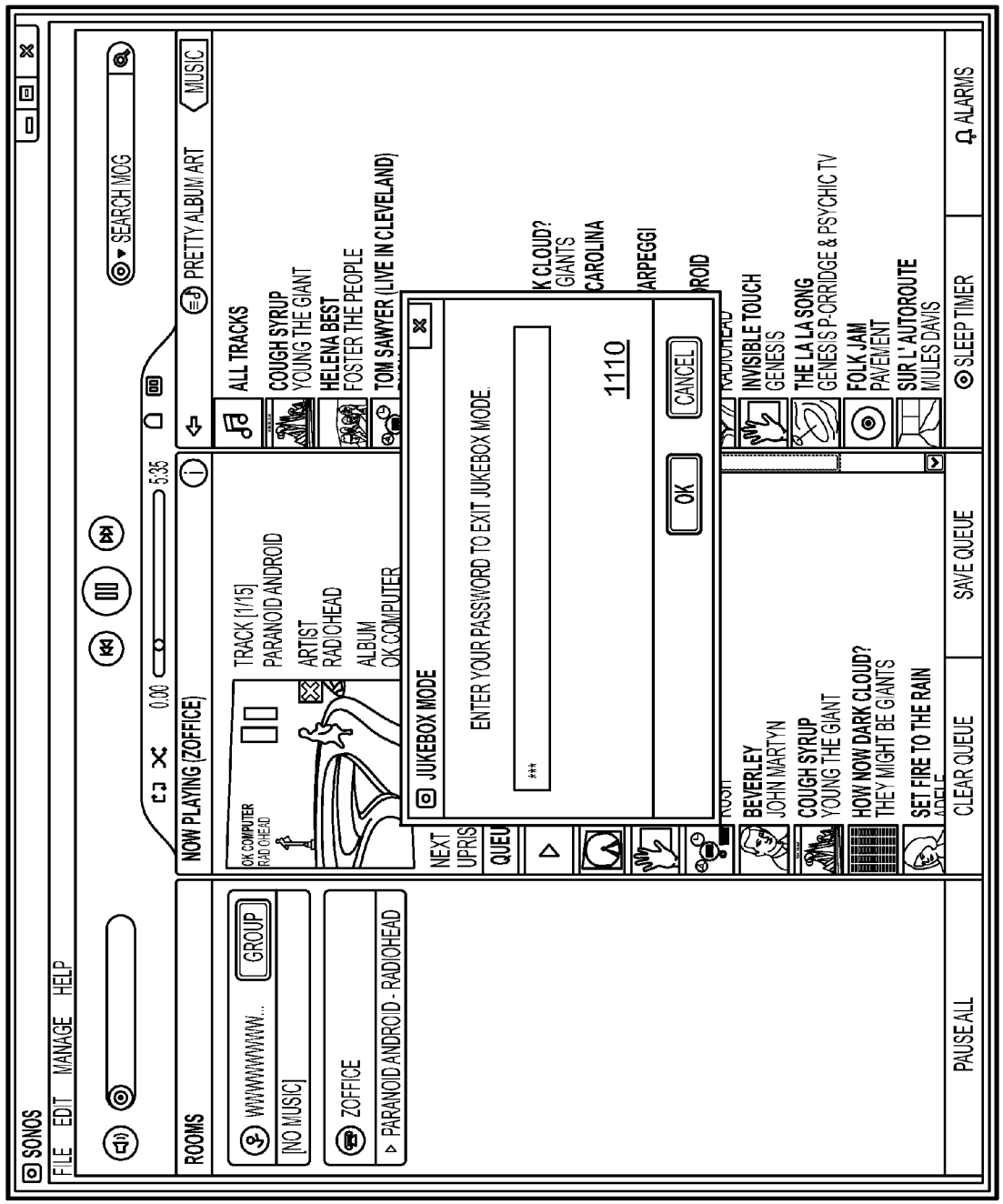

In FIG. 10, a user is asked to create a password 1010 when starting a party playlist mode. For example, a host may be asked to establish a password 1010 and/or other identifier that a participating user is to provide in order to add content to the playlist. In certain embodiments, a password and/or other authorization may be required to enter and/or to exit party playlist mode. In certain embodiments, a host may have a moderator password separate from a participating user password, where each password provides a differing level of access to affect content and/or behavior of the media playback system, for example. As shown in the example of FIG. 11, in order to exit party playlist mode, the user (e.g., the host) is to enter a password 1100 and/or other identification via the interface.

Figure 12:
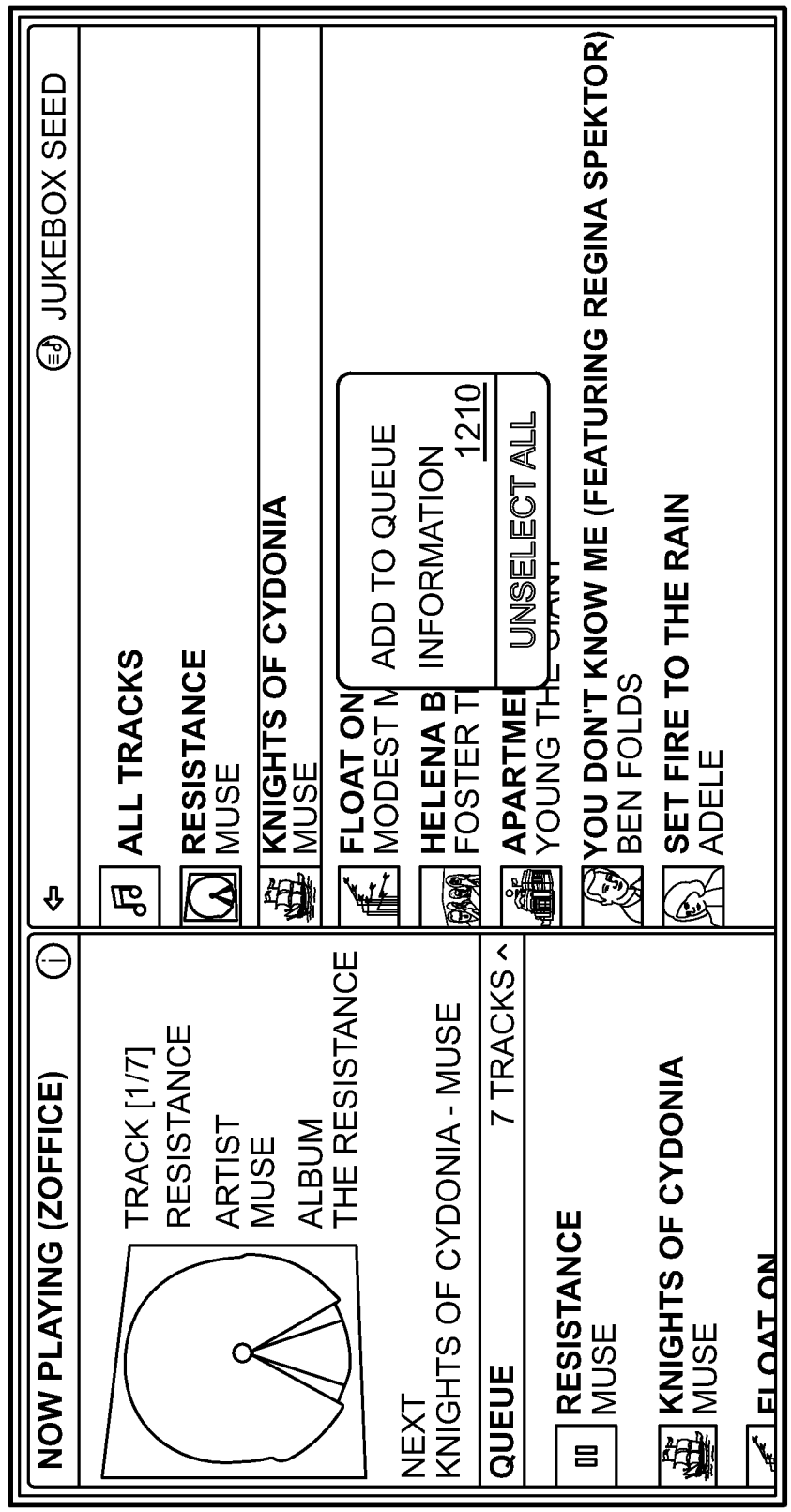
Figure 13:
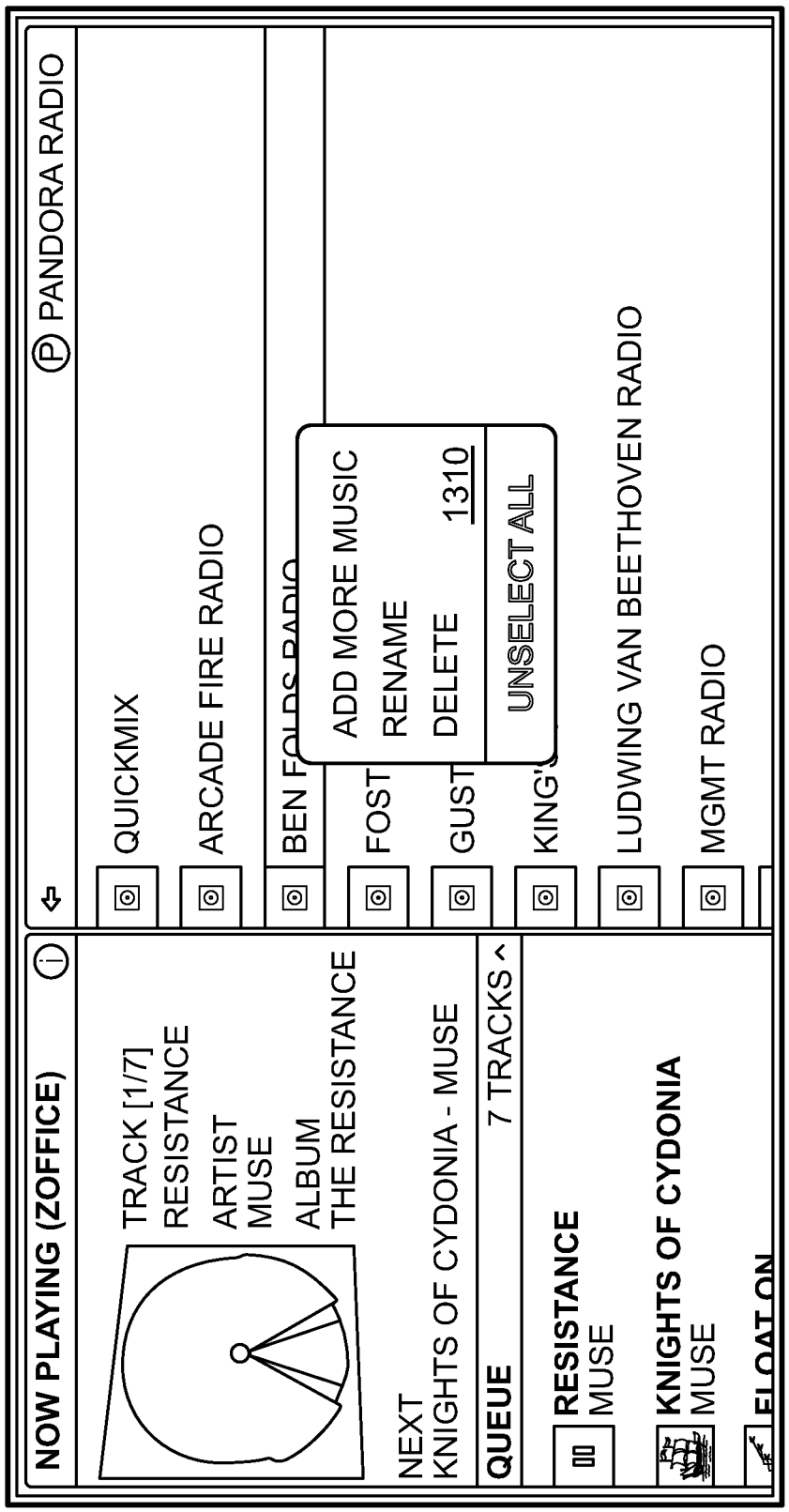
Figure 14:
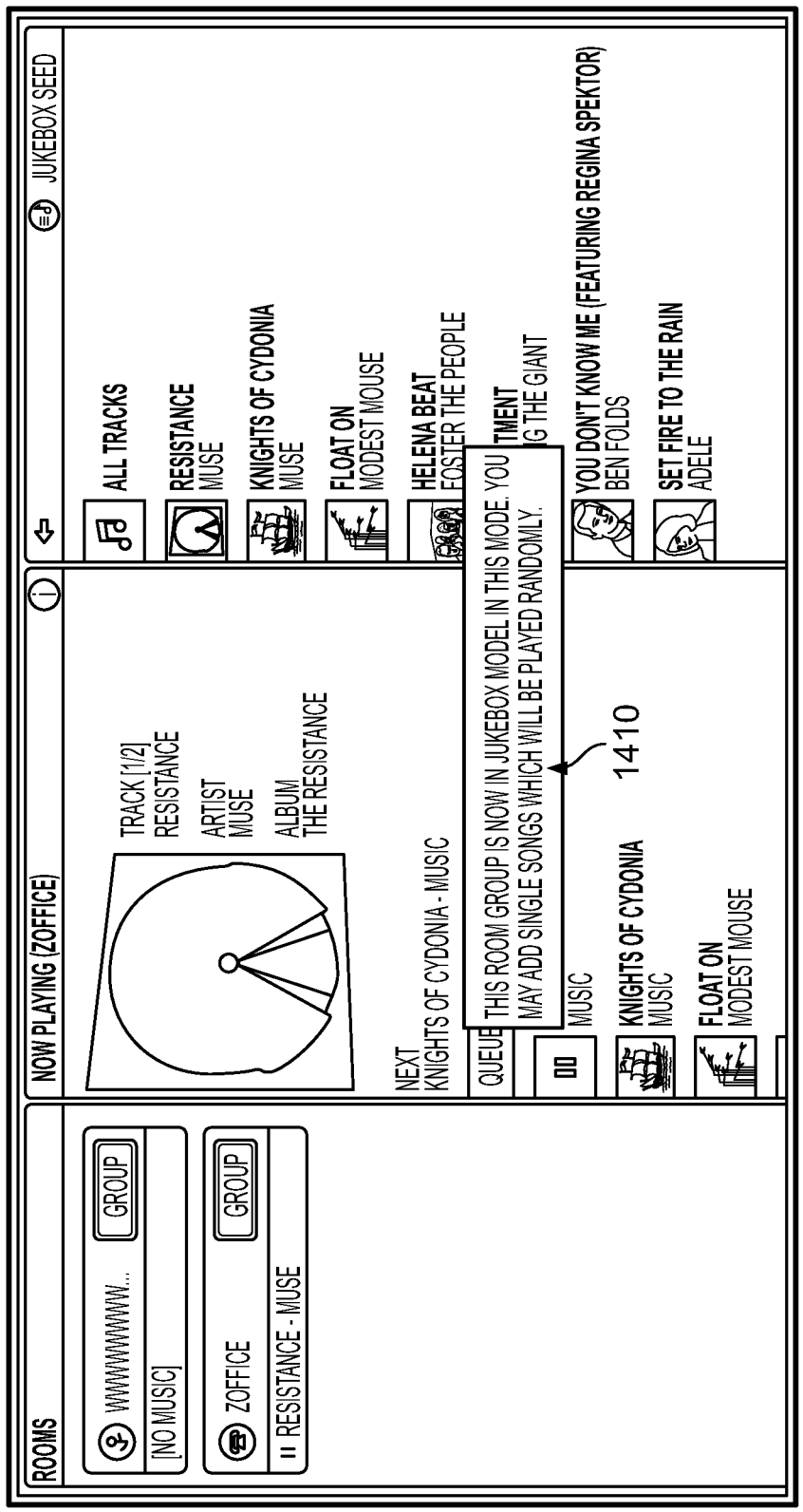
Figure 15:
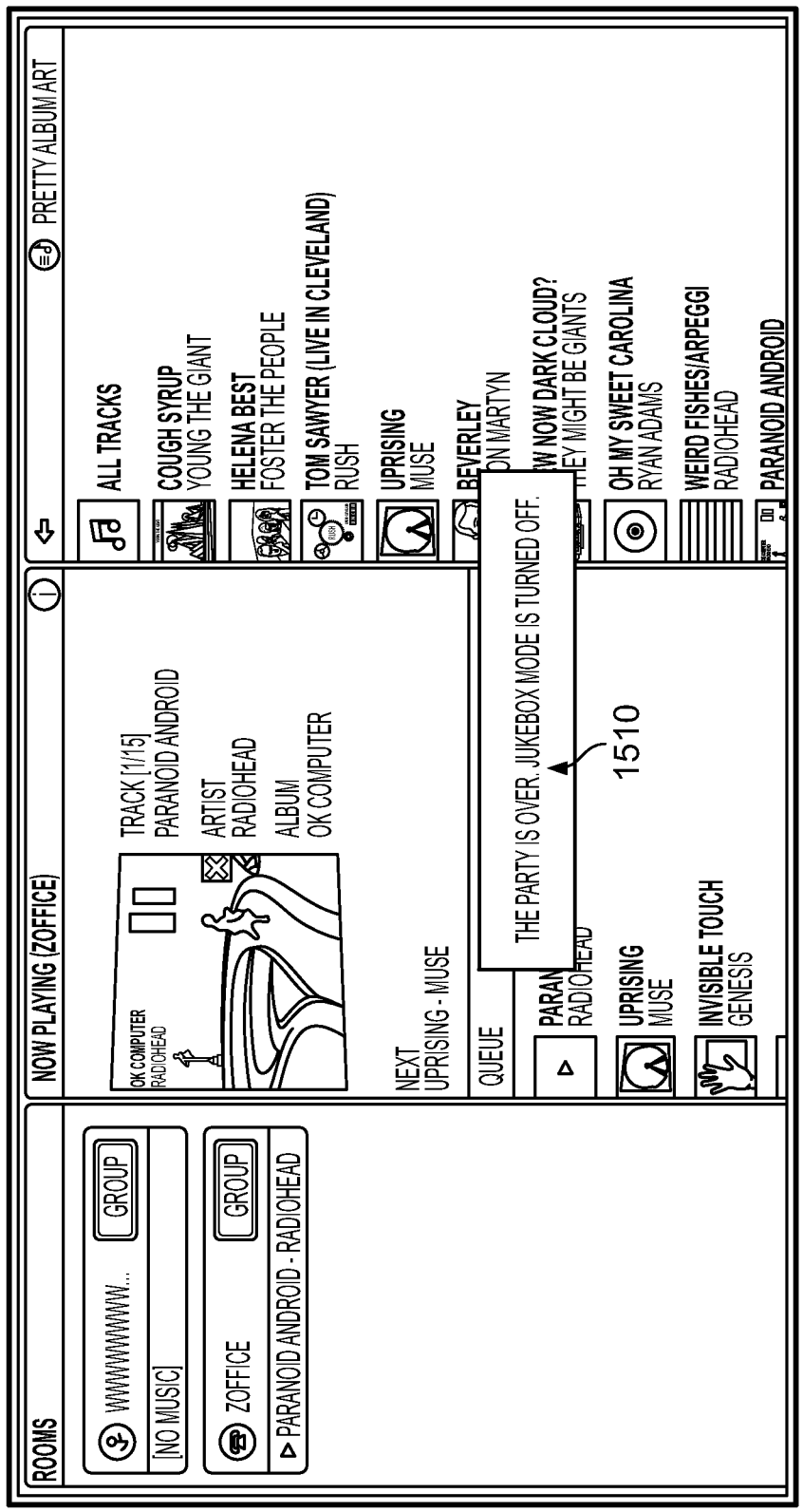

FIG. 12 shows an example of a restricted set of functions 1210 made available to a participating user in party playlist mode. In the example of FIG. 12, a user is provided with options 1210 to add selected content (e.g., track, album, etc.) to a playback queue or retrieve information regarding selected content (e.g., retrieve artist, album, date, etc., for a selected song). FIG. 13 shows another example of commands 1310 made available to a participating user who is requesting that content be added to a party playlist. Rather than playing or adding radio stations, in the example of FIG. 13, a user is only able to add more music, delete a track he/she added from the playlist, rename, etc. As shown in the example of FIG. 14, a party playlist queue can be displayed to a participating user, along with an indication 1410 that the selected zone group is in party playlist or "Jukebox" mode. In the example of FIG. 14, a user can add single songs that are to be played randomly from the party playlist. In FIG. 15, once party playlist mode has been exited, the example interface provides a notification 1510 that the party playlist mode is now off.

VI. Conclusion

As discussed above, systems and methods are provided to offer a restricted playback mode (e.g., a party playlist mode) to allow one or more participating users to access a media playback system and interact with a reduced subset of functions in that system (e.g., add content to a party playlist, vote on content, etc.). The embodiments described herein may be further useful by systems in which a limited-time, group-based access to a subset of available functionality is required or preferred.

Thus certain embodiments provide a method including providing, via a local media playback system, a restricted playback mode open to a plurality of participating users, the restricted playback mode providing a subset of playback functions from the local media playback system to the participating users, the subset including addition of content to a playlist for playback via the local media playback system. The example method includes facilitating addition of content to the playlist by at least one participating user. The example method includes facilitating playback of content from the playlist in the restricted playback mode.

Certain embodiments provide a tangible computer readable storage medium including instructions which, when executed by a processor, are to implement at least a method. The example method includes providing, via a local media playback system, a restricted playback mode open to a plurality of participating users, the restricted playback mode providing a subset of playback functions from the local media playback system to the participating users, the subset including addition of content to a playlist for playback via the local media playback system. The example method includes facilitating addition of content to the playlist by at least one participating user. The example method includes facilitating playback of content from the playlist in the restricted playback mode.

Certain embodiments provide a media playback system including one or more playback devices, each playback device including a processor, a memory and a speaker to output audio content provided to the playback device. The example system includes one or more controllers, each controller to facilitate review and addition of audio content for playback via the one or more playback devices. In the example system, at least one controller is to configure the media playback system in a restricted playback mode open to a plurality of participating users, the restricted playback mode to provide a subset of playback functions from the media playback system to the participating users, the subset including addition of content to a playlist for playback via the media playback system, the controller to facilitate addition of content to the playlist by at least one participating user and facilitate playback of content from the playlist in the restricted playback mode.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:
1. A method comprising:
receiving, by a media playback system including a plurality of playback zones that comprise at least one respective playback device, a request by a first control device to reconfigure one or more of the plurality of playback zones by changing a specific configuration of the playback devices, wherein the specific configuration comprises playback zones that include respective playback devices and a zone group that includes at least two of the playback zones;
determining whether the first control device is associated with one of a first playback mode or a second playback mode, wherein
(i) the first playback mode provides functions of the media playback system, the functions including reconfiguration of the specific configuration of the playback devices;
(ii) the second playback mode provides a subset of the functions, the subset (a) including at least addition of content for playback by at least one of the plurality of playback zones, and volume adjustment of the at least one of the plurality of playback zones and (b) excluding reconfiguration of the specific configuration of the playback devices;
based on a determination that the first control device is associated with the first playback mode, causing the one or more of the plurality of playback zones to be reconfigured;
receiving a request by a second control device to add one or more media items to a playback queue of the zone group for playback by the at least two playback zones of the zone group in synchrony;
determining whether the second control device is associated with one of the first playback mode or the second playback mode;
based on a determination that the second control device is associated with the second playback mode that includes at least addition of content for playback by the at least one of the plurality of playback zones, causing the one or more media items to be added to the playback queue of the zone group;
receiving a request by the second control device to adjust volume of the zone group to a given volume level; and
based on a determination that the second control device is associated with the second playback mode that includes at least volume adjustment of the at least one of the plurality of playback zones, adjusting volume of the at least two playback zones to the given volume level.

2. The method of claim 1, further comprising authenticating a user account associated with the second control device to enable the second control device to enter the second playback mode.

3. The method of claim 1, wherein receiving the request by a first control device to reconfigure one or more of the plurality of playback zones comprises receiving a request to link to the media playback system in one of (i) the first playback mode, or (ii) the second playback mode.

4. The method of claim 1,
wherein the media playback system is registered with a set of streaming media services, wherein the second control device is registered with a subset of the streaming media services, and wherein the subset of functions provided by the second playback mode includes playback of audio tracks from the subset of the streaming media services.

5. The method of claim 1, wherein the subset further includes transport control of playback by the at least one of the plurality of playback zones, and
wherein the method further comprises:
receiving a request by the second control device to initiate playback of the playback queue; and
based on a determination that the second control device is associated with the second playback mode that includes at least transport control of playback by the at least one of the playback zones, causing the at least two playback zones of the zone group to initiate playback of the playback queue in synchrony.

6. The method of claim 5, wherein initiating playback of the playback queue comprises a given playback device of the zone group retrieving the one or more media items via a network interface.

7. The method of claim 1, further comprising:
receiving a request from the first control device that is in the first playback mode to place the second control device in the second playback mode.

8. The method of claim 1, wherein the second control device is associated with the second playback mode for a limited period of time.

9. The method of claim 1, wherein the second playback mode provides access to the subset of functions for a limited physical location comprising the at least one of the plurality of playback zones.

10. The method of claim 1, wherein the subset of functions excludes adjustment of an equalization of the plurality of playback zones.

11. The method of claim 1,
wherein receiving the request by the first control device to reconfigure one or more of the plurality of playback zones by changing a specific configuration of the playback devices comprises the first control device receiving input indicating a request to reconfigure one or more of the plurality of playback zones by changing a specific configuration of the playback devices;
wherein causing the one or more of the plurality of playback zones to be reconfigured comprises the first control device sending, via network interface, an instruction that causes the one or more of the plurality of playback zones to be reconfigured;
wherein receiving the request by the second control device to add one or more media items to the playback queue of the zone group for playback by the at least two playback zones of the zone group in synchrony comprises the second control device receiving input indicating a request to add one or more media items to the playback queue of the zone group for playback by the at least two playback zones of the zone group in synchrony; and
wherein causing the one or more media items to be added to the playback queue of the zone group comprises the second control device sending, via a network interface, an instruction that causes the one or more media items to be added to the playback queue of the zone group;
wherein receiving a request by the second control device to adjust volume of the zone group to a given volume level comprises the second control device receiving input indicating a request by the second control device to adjust volume of the zone group to the given volume level; and
wherein adjusting volume of the at least two playback zones to the given volume level comprises the second control device sending, via a network interface, an instruction that causes the at least two playback zones of the zone group to adjust volume of the zone group to the given volume level.

12. The method of claim 1,
wherein receiving the request by the first control device to reconfigure one or more of the plurality of playback zones by changing a specific configuration of the playback devices comprises a given playback device receiving, via a network interface from the first control device, a request to reconfigure one or more of the plurality of playback zones by changing a specific configuration of the playback devices;
wherein causing the one or more of the plurality of playback zones to be reconfigured comprises the given playback device reconfiguring the one or more of the plurality of playback zones;
wherein receiving the request by the second control device to add one or more media items to the playback queue of the zone group for playback by the at least two playback zones of the zone group in synchrony comprises the zone group receiving, via a network interface from the second control device, the request to add one or more media items to the playback queue of the zone group for playback by the at least two playback zones of the zone group in synchrony;
wherein causing the one or more media items to be added to the playback queue of the zone group comprises the zone group adding the one or more media items to the playback queue of the zone group;
wherein receiving a request by the second control device to adjust volume of the zone group to a given volume level comprises the zone group receiving, via a network interface, the request by the second control device to adjust volume of the zone group to the given volume level; and
wherein adjusting volume of the at least two playback zones to the given volume level comprises playback devices of the zone group adjusting volume to the given volume level.

13. A non-transitory computer readable storage medium including instructions which, when executed by a processor, are to implement at least a method, the method comprising:
receiving, by a media playback system including a plurality of playback zones that comprise at least one respective playback device, a request by a first control device to reconfigure one or more of the plurality of playback zones by changing a specific configuration of the playback devices, wherein the specific configuration comprises playback zones that include respective playback devices and a zone group that includes at least two of the playback zones;
determining whether the first control device is associated with one of a first playback mode or a second playback mode, wherein
(i) the first playback mode provides functions of the media playback system, the functions including reconfiguration of the specific configuration of the playback devices;
(ii) the second playback mode provides a subset of the functions, the subset (a) including at least addition of content for playback by at least one of the plurality of playback zones, and volume adjustment of the at least one of the plurality of playback zones and (b) excluding reconfiguration of the specific configuration of the playback devices;
based on a determination that the first control device is associated with the first playback mode, causing the one or more of the plurality of playback zones to be reconfigured;
receiving a request by a second control device to add one or more media items to a playback queue of the zone group for playback by the at least two playback zones of the zone group in synchrony;
determining whether the second control device is associated with one of the first playback mode or the second playback mode;
based on a determination that the second control device is associated with the second playback mode that includes at least addition of content for playback by the at least one of the plurality of playback zones, adding the one or more media items to the playback queue of the zone group;
receiving a request by the second control device to adjust volume of the zone group to a given volume level; and
based on a determination that the second control device is associated with the second playback mode that includes at least volume adjustment of the at least one of the plurality of playback zones, adjusting volume of the at least two playback zones to the given volume level.

14. The non-transitory computer readable storage medium of claim 13, wherein the method further comprises authenticating a user account associated with the second control device to enable the second control device to enter the second playback mode.

15. The non-transitory computer readable storage medium of claim 13, wherein receiving the request by a first control device to reconfigure one or more of the plurality of playback zones comprises receiving a request to link to the media playback system in one of (i) the first playback mode, or (ii) the second playback mode.

16. The non-transitory computer readable storage medium of claim 13, wherein the media playback system is registered with a set of streaming media services, wherein the second control device is registered with a subset of the streaming media services, and wherein the subset of functions provided by the second playback mode includes playback of audio tracks from the subset of the streaming media services.

17. The non-transitory computer readable storage medium of claim 13, wherein the subset further includes transport control of playback by the at least one of the plurality of playback zones, and
wherein the method further comprises:
receiving a request by the second control device to initiate playback of the playback queue; and
based on a determination that the second control device is associated with the second playback mode that includes at least transport control of playback by the at least one of the playback zones, causing the at least two playback zones of the zone group to initiate playback of the playback queue in synchrony.

18. The non-transitory computer readable storage medium of claim 17, wherein initiating playback of the playback queue comprises a given playback device of the zone group retrieving the one or more media items via a network interface.

19. The non-transitory computer readable storage medium of claim 13, wherein the method further comprises receiving a request from the first control device that is in the first playback mode to place the second control device in the second playback mode.

20. The non-transitory computer readable storage medium of claim 13, wherein the second control device is associated with the second playback mode based on a time of day.

21. The non-transitory computer readable storage medium of claim 13, wherein the second playback mode provides access to the subset of functions for a limited physical location comprising the at least one of the plurality of playback zones.

22. The non-transitory computer readable storage medium of claim 13, wherein the subset of functions excludes adjustment of an equalization of the plurality of playback zones.

23. A media playback system comprising:
a plurality of playback devices, each playback device including a processor, a memory and a speaker to output audio content provided to the playback device, the plurality of playback devices organized into a plurality of playback zones;
wherein the media playback system is to:
receive a request by a first control device to reconfigure one or more of the plurality of playback zones by changing a specific configuration of the playback devices, wherein the specific configuration comprises playback zones that include respective playback devices and a zone group that includes at least two of the playback zones;
determine whether the first control device is associated with one of a first playback mode or a second playback mode, wherein
(i) the first playback mode provides functions of the media playback system, the functions including reconfiguration of the specific configuration of the playback devices;
(ii) the second playback mode provides a subset of the functions, the subset (a) including at least addition of content for playback by at least one of the plurality of playback zones, and volume adjustment of the at least one of the plurality of playback zones and (b) excluding reconfiguration of the specific configuration of the playback devices;
based on a determination that the first control device is associated with the first playback mode, reconfigure the one or more of the plurality of playback zones;
receiving a request by a second control device to add one or more media items to a playback queue of the zone group for playback by the at least two playback zones of the zone group in synchrony;
determine whether the second control device is associated with one of the first playback mode or the second playback mode;
based on a determination that the second control device is associated with the second playback mode that includes at least addition of content for playback by the at least one of the plurality of playback zones, add the one or more media items to the playback queue of the zone group;
receive a request by the second control device to adjust volume of the zone group to a given volume level; and
based on a determination that the second control device is associated with the second playback mode that includes at least volume adjustment of the at least one of the plurality of playback zones, adjust volume of the at least two playback zones to the given volume level.

24. The media playback system of claim 23,
wherein receiving the request by the first control device to reconfigure one or more of the plurality of playback zones by changing a specific configuration of the playback devices comprises the first control device receiving input indicating a request to reconfigure one or more of the plurality of playback zones by changing a specific configuration of the playback devices;
wherein causing the one or more of the plurality of playback zones to be reconfigured comprises the first control device sending, via network interface, an instruction that causes the one or more of the plurality of playback zones to be reconfigured;
wherein receiving the request by the second control device to add one or more media items to the playback queue of the zone group for playback by the at least two playback zones of the zone group in synchrony comprises the second control device receiving input indicating a request to add one or more media items to the playback queue of the zone group for playback by the at least two playback zones of the zone group in synchrony;
wherein causing the one or more media items to be added to the playback queue of the zone group comprises the second control device sending, via a network interface, an instruction that causes the one or more media items to be added to the playback queue of the zone group;
wherein receiving a request by the second control device to adjust volume of the zone group to a given volume level comprises the second control device receiving input indicating a request by the second control device to adjust volume of the zone group to the given volume level; and
wherein adjusting volume of the at least two playback zones to the given volume level comprises the second control device sending, via a network interface, an instruction that causes the at least two playback zones of the zone group to adjust volume of the zone group to the given volume level.

25. The media playback system of claim 23,
wherein receiving the request by the first control device to reconfigure one or more of the plurality of playback zones by changing a specific configuration of the playback devices comprises a given playback device receiving, via a network interface from the first control device, a request to reconfigure one or more of the plurality of playback zones by changing a specific configuration of the playback devices;
wherein causing the one or more of the plurality of playback zones to be reconfigured comprises the given playback device reconfiguring the one or more of the plurality of playback zones;
wherein receiving the request by the second control device to add one or more media items to the playback queue of the zone group for playback by the at least two playback zones of the zone group in synchrony comprises the zone group receiving, via a network interface from the second control device, the request to add one or more media items to the playback queue of the zone group for playback by the at least two playback zones of the zone group in synchrony;
wherein causing the one or more media items to be added to the playback queue of the zone group comprises the zone group adding the one or more media items to the playback queue of the zone group;
wherein receiving a request by the second control device to adjust volume of the zone group to a given volume level comprises the zone group receiving, via a network interface, the request by the second control device to adjust volume of the zone group to the given volume level; and wherein adjusting volume of the at least two playback zones to the given volume level comprises playback devices of the zone group adjusting volume to the given volume level.

26. A playback device comprising: one or more processors; and tangible, non-transitory, computer-readable media having instructions encoded therein, wherein the instructions, when executed by the one or more processors, cause the playback device to perform a method comprising:
receiving a request by a first control device to reconfigure one or more of a plurality of playback zones by changing a specific configuration of playback devices as members of respective playback zones of a media playback system, wherein the specific configuration comprises playback zones that include respective playback devices and at least two of the playback zones as a zone group;
determining whether the first control device is associated with one of a first playback mode or a second playback mode, wherein
(i) the first playback mode provides functions of the media playback system, the functions including reconfiguration of the specific configuration of the playback devices;
(ii) the second playback mode provides a subset of the functions, the subset (a) including at least addition of content for playback by at least one of the plurality of playback zones, and volume adjustment of the at least one of the plurality of playback zones and (b) excluding reconfiguration of the specific configuration of the playback devices;
based on a determination that the first control device is associated with the first playback mode, reconfiguring the one or more of the plurality of playback zones;
receiving a request by a second control device to add one or more media items to a playback queue of the zone group for playback by the at least two playback zones of the zone group in synchrony;
determining whether the second control device is associated with one of the first playback mode or the second playback mode;
based on a determination that the second control device is associated with the second playback mode that includes at least addition of content for playback by the at least one of the plurality of playback zones, adding the one or more media items to the playback queue of the zone group;
receiving a request by the second control device to adjust volume of the zone group to a given volume level; and
based on a determination that the second control device is associated with the second playback mode that includes at least volume adjustment of the at least one of the plurality of playback zones, adjusting volume of the at least two playback zones to the given volume level.

27. The playback device of claim 26, the method further comprising authenticating a user account associated with the second control device to enable the second control device to enter the second playback mode.

28. The playback device of claim 26, wherein receiving the request by a first control device to reconfigure one or more of the plurality of playback zones comprises receiving a request to link to the media playback system in one of (i) the first playback mode, or (ii) the second playback mode.

29. The playback device of claim 26,
wherein the media playback system is registered with a set of streaming media services, wherein the second control device is registered with a subset of the streaming media services, and wherein the subset of functions provided by the second playback mode (a) includes playback of audio tracks from the subset of the streaming media services and (b) excludes playback of audio tracks from streaming services that are exclusive of the subset of the streaming media services.

30. The playback device of claim 29,
wherein the media playback system is registered with a set of streaming media services, wherein the second control device is registered with a subset of the streaming media services, and wherein the subset of functions provided by the second playback mode (a) includes playback of audio tracks from the subset of the streaming media services and (b) excludes playback of audio tracks from streaming services that are exclusive of the subset of the streaming media services.

31. The playback device of claim 26, wherein the subset further includes transport control of playback by the at least one of the plurality of playback zones, and
wherein the method further comprises:
receiving a request by the second control device to initiate playback of the playback queue; and
based on a determination that the second control device is associated with the second playback mode that includes at least transport control of playback by the at least one of the playback zones, causing the at least two playback zones of the zone group to initiate playback of the playback queue in synchrony.

32. The playback device of claim 31, wherein initiating playback of the playback queue comprises a given playback device of the zone group retrieving the one or more media items via a network interface.

33. The playback device of claim 26, the method further comprising:
receiving a request from the first control device that is in the first playback mode to place the second control device in the second playback mode.

34. The playback device of claim 26, wherein the second control device is associated with the second playback mode for a limited period of time.

35. The playback device of claim 26, wherein the second playback mode provides access to the subset of functions for a limited physical location comprising the at least one of the plurality of playback zones.

36. The playback device of claim 26, wherein the subset of functions excludes adjustment of an equalization of the plurality of playback zones.

37. The playback device of claim 26, wherein the subset of functions further excludes renaming the playback zones of the plurality of playback zones.

38. The playback device of claim 26, the method further comprising:
receiving a request by the second control device to reconfigure one or more of a plurality of playback zones by changing the specific configuration; and
based on a determination that the second control device is associated with the second playback mode, denying reconfiguration of the one or more of the plurality of playback zones according to the received request.

39. The playback device of claim 26, the method further comprising:
receiving a request by the first control device to place the second control device into the second playback mode for a limited period of time; and
based on a determination that the first control device is associated with the first playback mode, placing the second control device into the second playback mode for a limited period of time.

* * * * *